US008136475B2

(12) United States Patent
Davis et al.

(10) Patent No.: US 8,136,475 B2

(45) Date of Patent: Mar. 20, 2012

(54) CONTROLLED ENVIRONMENT CHAMBER FOR APPLYING A COATING MATERIAL TO A SURFACE OF A MEMBER

(75) Inventors: Bruce R. Davis, Seattle, WA (US); Michael M. Stepan, Superior, MT (US)

(73) Assignee: The Boeing Company, Chicago, IL (US)

(*) Notice: Subject to any disclaimer, the term of this patent is extended or adjusted under 35 U.S.C. 154(b) by 575 days.

(21) Appl. No.: 12/349,334

(22) Filed: Jan. 6, 2009

(65) Prior Publication Data

US 2010/0173090 A1 Jul. 8, 2010

(51) Int. Cl.

| | |
|---|---|
| ***B05B 15/04*** | (2006.01) |
| ***B05B 13/02*** | (2006.01) |
| ***B05B 3/00*** | (2006.01) |
| ***B05C 11/00*** | (2006.01) |
| ***B05C 11/11*** | (2006.01) |
| *B05D 1/32* | (2006.01) |
| *B05D 5/00* | (2006.01) |
| *F16B 39/02* | (2006.01) |

(52) U.S. Cl. .......... 118/301; 118/64; 118/307; 118/323; 118/505; 118/DIG. 11; 427/272; 427/427.3; 411/82; 411/88; 206/379; 205/118; 29/13; 29/896.42; 29/402.15; 29/408

(58) Field of Classification Search .................... 118/64, 118/301, 307, 323, 505, DIG. 11; 427/272, 427/427.3; 411/82, 88; 29/13, 896.42
See application file for complete search history.

(56) References Cited

U.S. PATENT DOCUMENTS

| | | | | |
|---|---|---|---|---|
| 3,601,088 A | | 8/1971 | Lacam | |
| 3,890,921 A | * | 6/1975 | Szczepanski | 118/696 |
| 3,964,432 A | * | 6/1976 | Schwenninger | 118/314 |
| 4,184,448 A | * | 1/1980 | Aichert et al. | 118/729 |
| 4,278,046 A | | 7/1981 | Clarke et al. | |
| 4,401,053 A | * | 8/1983 | Riley | 118/721 |
| 4,440,582 A | * | 4/1984 | Smith et al. | 428/447 |
| 4,584,964 A | * | 4/1986 | Engel | 118/697 |
| 4,593,360 A | * | 6/1986 | Cocks | 700/123 |
| 4,611,695 A | | 9/1986 | Kato et al. | |
| 4,888,214 A | * | 12/1989 | Duffy et al. | 427/183 |
| 4,919,967 A | | 4/1990 | Handke et al. | |
| 5,213,259 A | * | 5/1993 | Stouffer | 236/44 C |
| 5,238,496 A | | 8/1993 | Koponen | |
| 5,456,755 A | | 10/1995 | Oomori et al. | |
| 5,462,601 A | * | 10/1995 | Falcoff et al. | 118/697 |
| 5,476,689 A | * | 12/1995 | Stone et al. | 427/477 |
| 5,501,736 A | * | 3/1996 | Statz et al. | 118/500 |
| 5,547,325 A | * | 8/1996 | Tucker et al. | 411/442 |

(Continued)

*Primary Examiner* — Dah-Wei Yuan
*Assistant Examiner* — Karl Kurple
(74) *Attorney, Agent, or Firm* — Novatech IP Law; Dennis R. Plank

(57) ABSTRACT

A painting apparatus for applying a coating material to a member surface of a member comprises a housing, at least one slide rail, a rack assembly, a cross beam and a spraying device. The slide rail may be mountable within the housing and may have a plurality of rack positions. The rack assembly is mountable within the housing at one of the rack positions. The rack assembly is configured to support the member such that the member surface is exposed. The cross beam may be coupled to the slide rail. The cross beam is movable along the slide rail and is positionable at the rack positions. The spraying device is mountable on the cross beam and is configured to move along the cross beam while spraying the coating material onto the member surface.

12 Claims, 13 Drawing Sheets

U.S. PATENT DOCUMENTS 5,733,374 A 3/1998 Ekenberg
5,779,420 A * 7/1998 Huang .......................... 411/442
5,814,375 A 9/1998 Hissen
6,156,392 A 12/2000 Duffy et al.
6,272,814 B1 * 8/2001 Ikuta et al. ...................... 53/473
6,395,346 B1 5/2002 Duffy et al.
6,508,926 B1 * 1/2003 Falkner et al. ................ 205/118
6,558,489 B2 * 5/2003 Dolker et al. ................... 156/64
6,776,843 B2 8/2004 Fouvet et al.
7,192,484 B2 * 3/2007 Chappa et al. ................ 118/300
7,273,337 B2 * 9/2007 Lat et al. ....................... 411/443
7,594,985 B2 * 9/2009 Yake et al. .................... 204/486
2001/0051080 A1 * 12/2001 Godsted et al. .............. 411/82.2
2007/0267520 A1 * 11/2007 Raggi et al. ................... 239/328
2008/0129773 A1 * 6/2008 Iwata .............................. 347/17
2008/0304053 A1 * 12/2008 Snow et al. ................ 356/237.3

* cited by examiner 10,140
Regulator & Gauge
110
Y-Axis Linear Belt Driven Axis
90
AIR MOTOR
100
LIMIT SWITCH
114
1
2
3
4
5
REVERSE
FORWARD
LIMIT SWITCH
100
LIMIT SWITCH
100
144
Move-Down
143
Move-Up
145
E-Stop

CONTROLLED ENVIRONMENT CHAMBER FOR APPLYING A COATING MATERIAL TO A SURFACE OF A MEMBER

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to coating systems and, more particularly, to controlled-environment painting apparatuses for applying coatings to a plurality of items such as mechanical fasteners.

BACKGROUND

Manufacturers are continuously implementing new production techniques and build philosophies in efforts to reduce production cycle time and cost. Particularly for manufacturers of large-scale assemblies such as commercial aircraft, minor improvements to the production process can lead to appreciable reductions in production time and cost. One approach to reducing production cycle time and cost is to reduce the amount of labor required at final assembly. In this approach, instead of receiving a multitude of individual components and partially-completed subassemblies from a variety of different subcontractors for final assembly, large-scale manufacturers may assign to subcontractors a larger share of the production process by requesting that subcontractors provide subassemblies in a more completed state. In furtherance of this approach, large-scale manufacturers may request that the subcontractors deliver the subassemblies in a pre-painted condition.

At final assembly, mechanical fasteners such as bolts and screws may be employed to assemble the various subassemblies. Certain fasteners such as those that are exposed to the aircraft exterior must also be available at final assembly in a pre-painted condition. The heads of such fasteners may be pre-painted to match the pre-painted subassemblies. Considering the large quantity of subassemblies that make up a commercial aircraft and the overall size of such aircraft, the quantity of fasteners that must be provided in a pre-painted condition may be relatively large.

The success of the above-described build philosophy is dependent at least in part upon the availability of qualified subcontractors to perform the painting operations in a manner that is consistent with the manufacturer's quality and timeliness requirements. In this regard, the ability to achieve a reduction in production cycle time is dependent upon the ability of the subcontractor to deliver the subassembly on schedule. The ability of the subcontractor to meet quality requirements may be dependent upon the subcontractor's access to appropriate equipment and the availability of skilled technicians.

Such equipment and technicians may be necessary to meet specific requirements regarding the preparation, priming and application of intermediate and topcoat paint layers to the fasteners heads. For example, paint and other coating materials for aircraft are typically applied with precise control of film thicknesses. Difficulties in meeting film thickness requirements can occur as a result of inconsistencies during manual application of paint. Furthermore, inappropriate temperature and humidity levels during application of the paint and during curing of the paint can result in inconsistencies in adhesion and appearance (e.g., runs, wrinkles) of the painted fastener heads.

As a result of such stringent requirements, the number of subcontractors that are qualified to provide painting services may be limited. The limited number of qualified subcontractors may impact the ability to provide the large quantity of pre-painted fasteners on schedule. Difficulties in meeting schedule may be exacerbated by subcontractors that are qualified but are located remotely from the manufacturer such as in out-of-state locations. Furthermore, the remote location of such qualified subcontractors may limit the ability to procure pre-painted fasteners on an emergent need basis at final assembly. Such emergent need may occur as a result of part shortages on the production line.

Although the erection by the manufacturer of an on-site painting facility and curing oven may eliminate problems associated with the limited availability of qualified subcontractors, the construction of such a facility would defeat the goal of shifting a larger share of the production process to the subcontractors. Furthermore, the construction, operation and maintenance of an on-site painting facility and a curing oven having the requisite temperature and humidity control capabilities may be prohibitively expensive.

As can be seen, there exists a need in the art for a painting apparatus that provides an environment wherein large quantities of components such as mechanical fasteners can be painted with precise control of temperature and humidity. Furthermore, there exists a need in the art for a painting apparatus that facilitates the application of paint to fastener heads at a desired film thickness and on an automated basis without the need for skilled labor. Additionally, there exists a need in the art for a painting apparatus that allows for the painting of fastener heads on an emergent need basis. Finally, it is desirable that such painting apparatus is simple in construction and low in cost.

BRIEF SUMMARY

The above-described needs associated with the application of paint and other coating materials to fasteners and other members is specifically addressed by a self-contained painting apparatus that is adapted for applying coating materials to one or more surfaces of members which may be of any shape, size and configuration. For example, the members may be configured as elongate members such as, without limitation, mechanical fasteners having a head and a shaft and which may include bolts, screws, rivets, pins, and a variety of other configurations. However the members may be provided in non-fastener configurations having a variety of shapes and sizes and which may include one or more member surfaces to which the coating material may be applied using the painting apparatus as disclosed herein.

The painting apparatus may be provided in a relatively small size to facilitate transporting thereof to different locations such as different locations of a manufacturing or assembly facility. In addition, by providing the painting apparatus in a relatively small size, the temperature and humidity level of an interior environment of the painting apparatus may be easily controlled and maintained such as by using a pressurized air source. Even further, the relatively small size may simplify construction and reduce the cost of the painting apparatus as compared to relatively large, stationary paint booths and curing ovens which may be more costly to construct, operate and maintain and which may permanently occupy a relatively large area.

The painting apparatus may used to apply a variety of different coating materials to the surfaces of the members at a controlled sweep rate and at a controlled standoff distance from the member surfaces of the members. In addition, the painting apparatus allows for the application of coating materials in an automated manner in order to improve the accuracy and consistency of film thickness, coating adhesion and finish appearance as compared to prior art methods that rely on manual application by skilled operators.

The painting apparatus may include an enclosable housing having at least one spraying device movably mounted within the housing. The spraying device may be configured as a spray gun movably mounted to a cross beam. The cross beam may be movably mounted to at least one slide rail which may be mounted within the housing. The cross beam may be movable along the slide rail which may include at least one rack position. The cross beam may be operative to stop at one or more rack positions of the slide rail.

When the cross beam is stopped at the rack position, the spraying device may sweep or move along the cross beam while spraying coating material onto at least one member surface of one or more members mounted on a rack assembly. The member may comprise a fastener such as bolts, screws, rivets, pins, and a variety of other configurations. The member surface may comprise at least one surface of a head of the fastener. For example, the member surface may comprise a top surface of the head, a side surface of the head or any other surface of the fastener. In this regard, the head may comprise any surface or portion thereof that may receive coating material sprayed by the spraying device. Furthermore, the member surface may comprise any surface of any member of any size, shape, and configuration including, without limitation, any structural or mechanical element, component, system, assembly, subassembly or other configuration. In this regard, the painting apparatus may facilitate the application of coating material to any member or portion thereof and is not limited to elongate members such as fasteners.

The member may be mounted in a rack assembly which may be mounted in the housing. Each of the rack assemblies is preferably, but optionally, positioned in correspondence with each of the rack positions such that the spraying device is properly positioned with respect to the rack assembly as it moves along the cross beam. For configurations wherein the members are comprised of fasteners having heads, the fasteners may be mounted in the rack assemblies such that the heads or other member surfaces associated with the fastener may be exposed to the spraying device in order to receive the coating material that is sprayed thereby.

The movement of the cross beam along the one or more slide rails may be driven by any suitable power source including, but not limited to, pneumatic, electrical, hydraulic, and/or mechanical power or various combinations thereof such as electro-mechanical power, hydro-mechanical power or by power provided by an internal combustion engine or the cross beam may be manually-driven. In an embodiment, pneumatic power may be used in combination with one or more air motors that may be mounted at any suitable location on the painting apparatus. For example, at least one air motor may be mounted on at least one slide rail such as at one of opposing ends of the slide rail. Likewise, movement of the spraying device along the cross beam may be driven by any suitable power source such as any of the power sources indicated above with regard to driving the cross beam along the slide rails. In an embodiment for driving the spraying device along the cross beam, pneumatic power may be used in combination with one or more air motors mounted at any suitable location such as at one of opposing ends of the cross beam. Advantageously, the use of pneumatic power to drive the movement of the cross beam and the spraying device may avoid hazards normally associated with flammable gases or vapors in the presence of an electrical source of ignition such as electrically-powered motors.

For pneumatically-powered painting apparatuses, pneumatic power may be provided by a pneumatic source that may be located at any location such as on or adjacent to the housing. The pneumatic source may be remotely located relative to the housing. The pneumatic source may be fluidly connected to the housing via one or more conduits. The pneumatic power may be controlled using an appropriate pneumatic circuit comprising, for example, regulators, valves, air cylinders and other components such as limit switches. A pressurized air source may be located remotely to the housing and may be fluidly connected thereto in order to deliver pressurized, conditioned air to the housing.

The housing may be enclosable using one or more removable or pivotable doors and/or lid in order to form an environmentally-controllable chamber. The air source may maintain the temperature and/or relative humidity level of the chamber during application of the coating material and during curing of the coating material which may be different that the temperature and humidity level required during application of the coating material.

In preparation for applying coating material to one or more member surfaces of one or more members, the members may be loaded onto a panel. The members may be loaded onto the panel prior to loading the panel onto into the housing. For example, members such as fasteners may be loaded onto a panel prior to loading the panel onto a base support of the rack assembly which may be fixedly mounted inside the housing. As indicated above, the fasteners may each include a head and may have a shaft extending from the head. The rack assembly and/or panel may optionally include a plurality of apertures that may be formed as a pattern of holes or slots. The apertures are preferably sized and configured to receive the shafts such that each one of the members is supported by the head which may rest upon an upper surface of the panel or rack assembly. Following loading of the members (e.g., fasteners) onto the panels, the panels may be loaded onto the rack assemblies which may be positioned within the housing. Each one of the panels may be secured in position on a corresponding one of the rack assemblies such as by using a clamping mechanism.

Once the panels are loaded onto the rack assemblies in the housing, the cross beam may be successively moved to each rack position. At each rack position, the spraying device may move along the cross beam spraying coating material onto the member surfaces of one or more members such as fasteners that may be loaded in the rack assembly at that rack position. After the coating material is sprayed onto the member surfaces of the members, an ejection or lifting mechanism may be employed to lift the members such that the member surfaces may be separated from the upper surface of the rack assembly. For example, for configurations wherein the member is a fastener having a head and a shaft, the lifting mechanism may push upwardly on the shaft to lift the fastener head away from the upper surface of the rack assembly to prevent paint bridging between the heads and the upper surface of the rack assembly. The lifting mechanism may maintain the member surfaces (e.g., heads) in spaced relation to the upper surface during curing of the paint. Following curing of the coating material on the member surfaces, the panels may be removed from the housing after which the members may be removed from the panels.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 10:
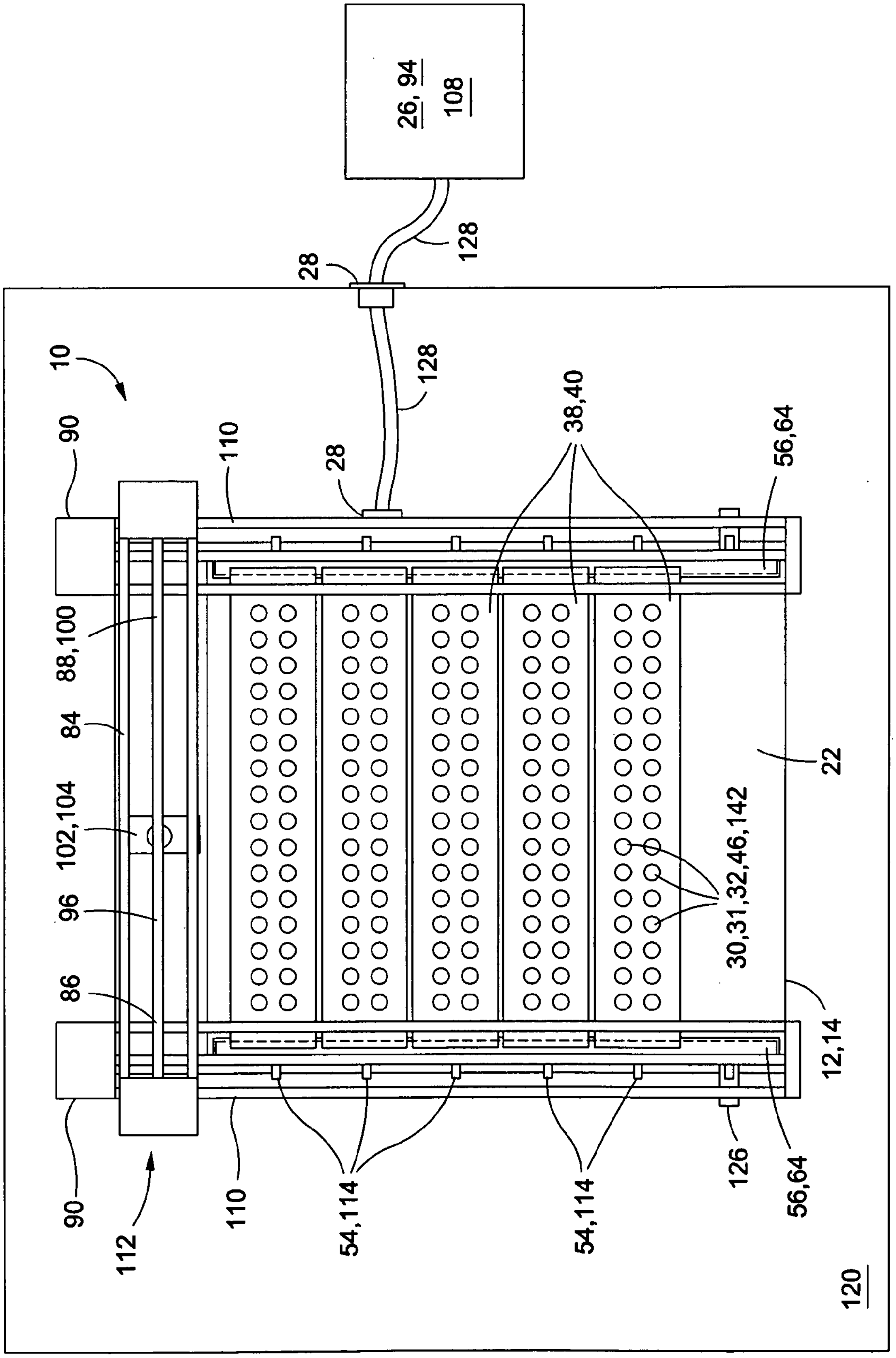
FIG. 10 is a top schematic illustration of the painting apparatus positioned inside the paint booth and illustrating an air source optionally located exterior to the paint booth.
Figures 11, 11A, 11B:
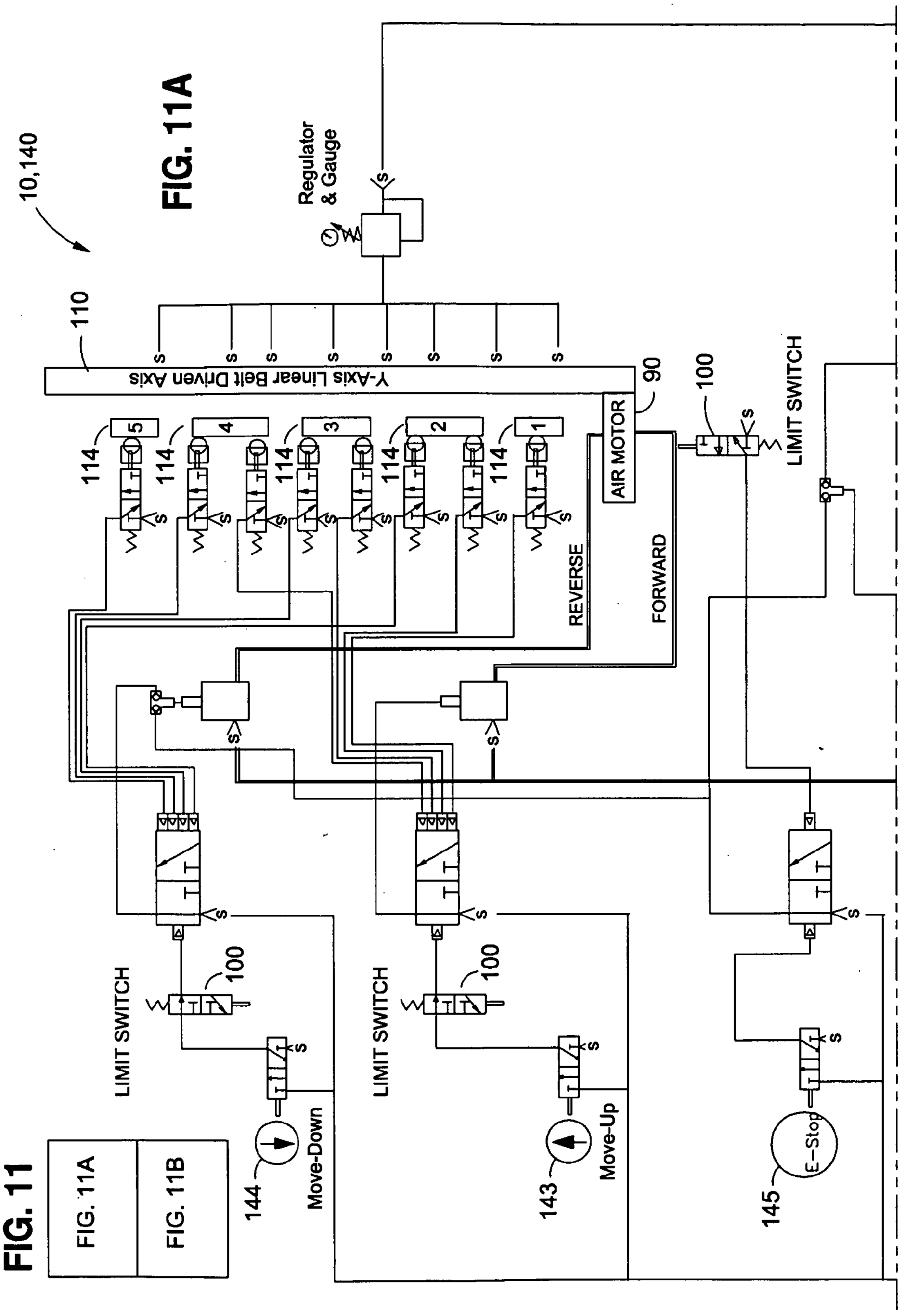
FIG. 11 comprises FIGS. 11A-11B which collectively illustrate a pneumatic circuit in one embodiment as may be included with the painting apparatus.
Figure 11B:
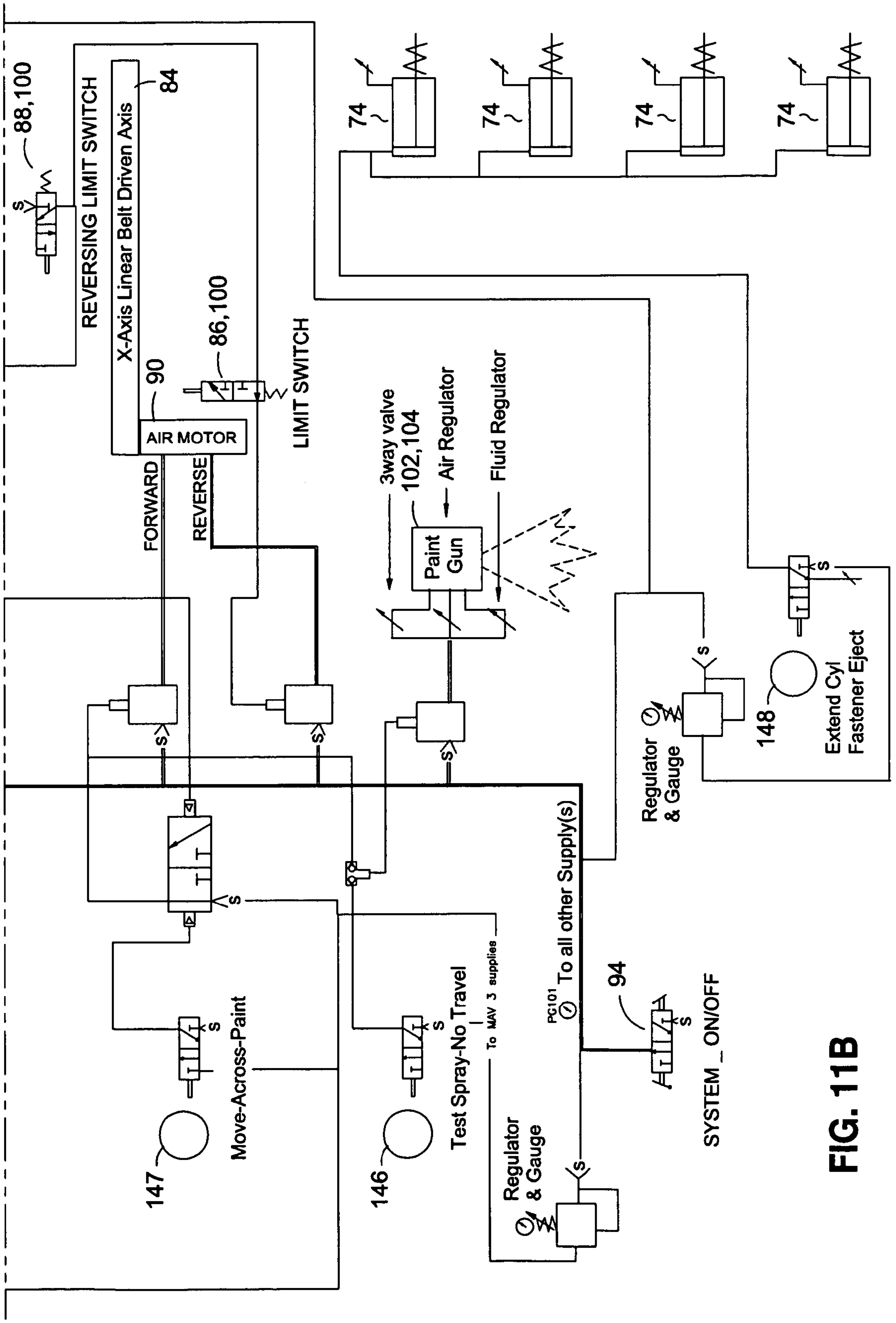
Figure 12A:
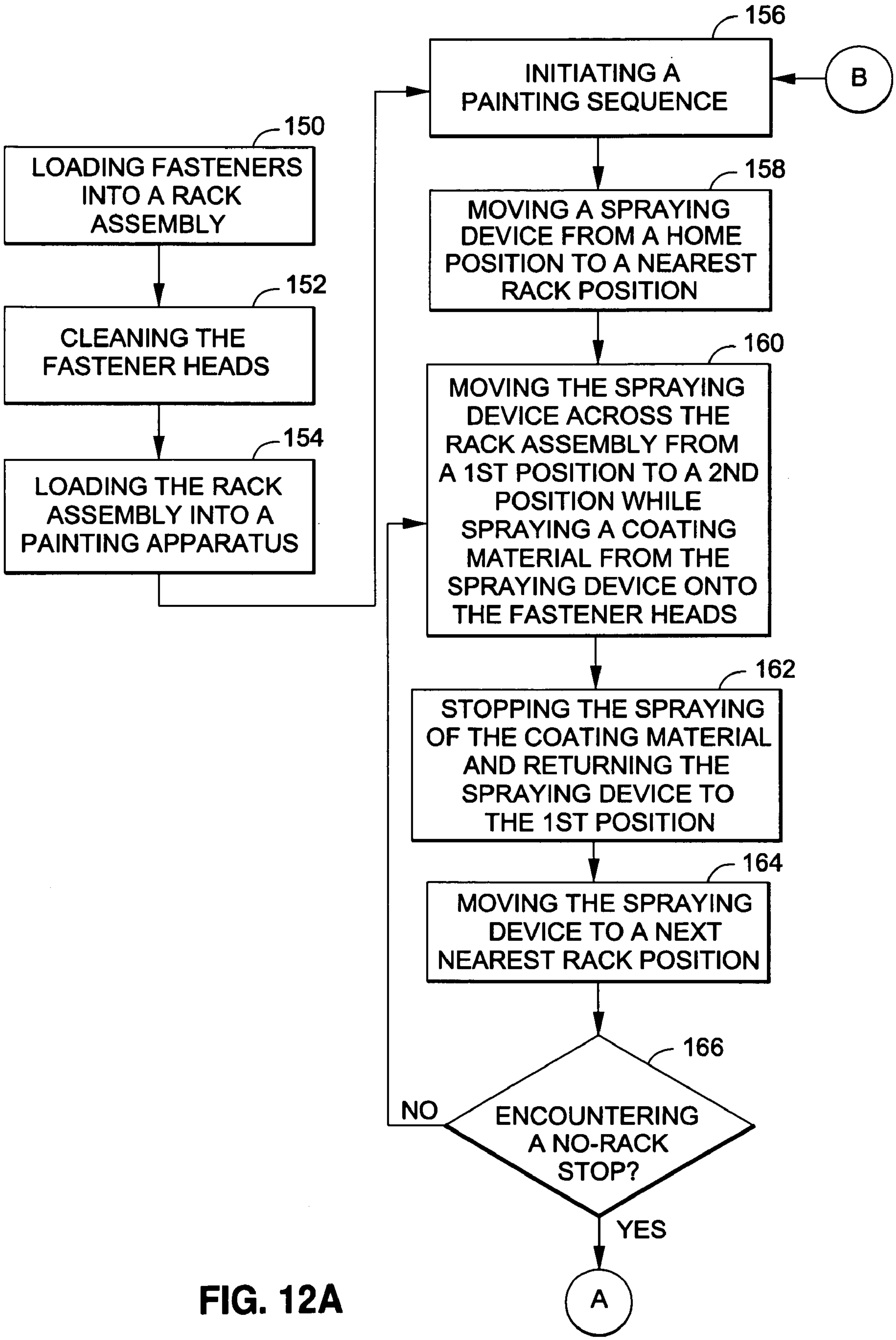
FIGS. 12A-12B collectively illustrate a methodology for applying the coating material to a plurality of member heads.
Figure 12B:
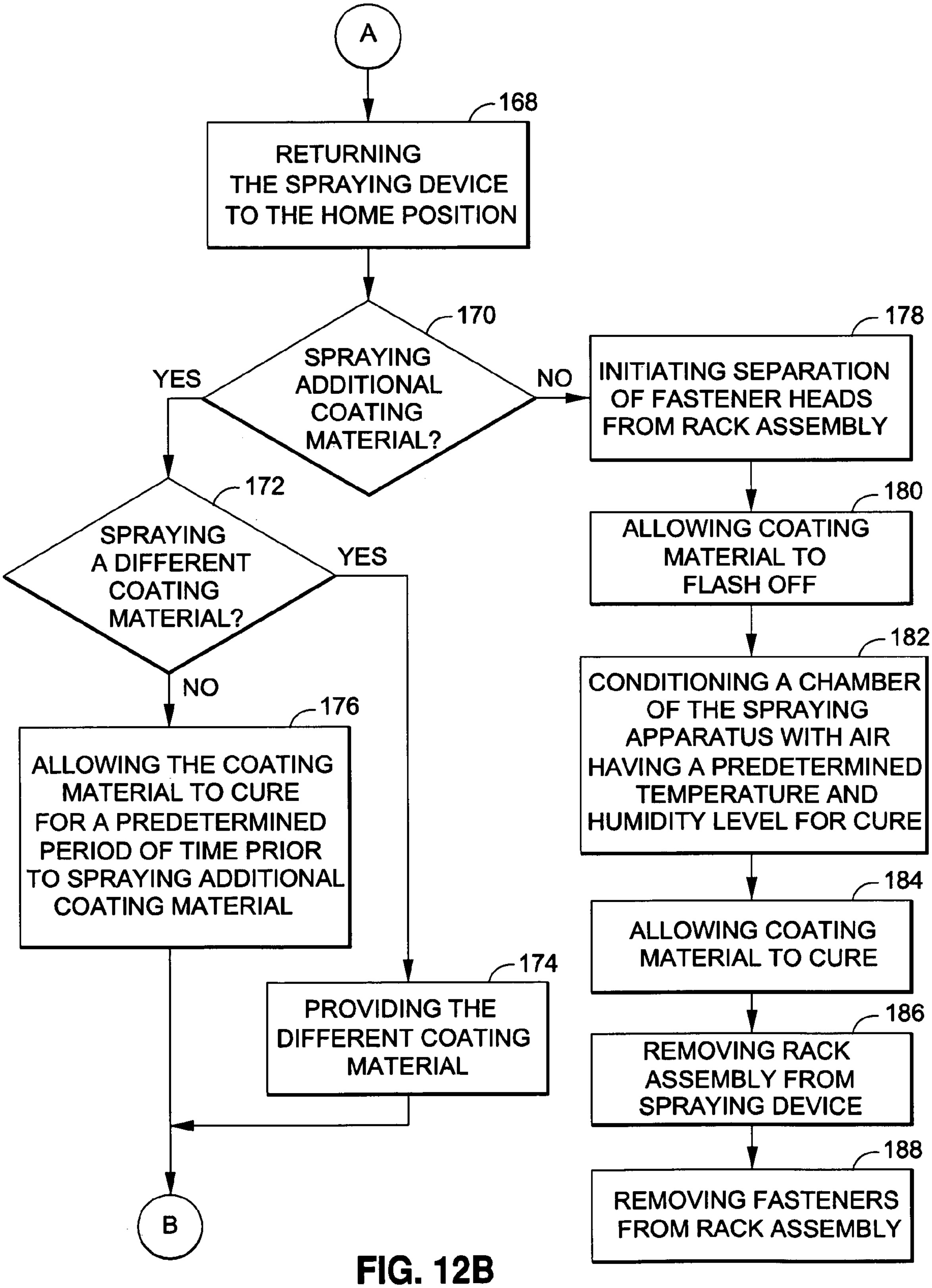

Referring now to the drawings wherein the showings are for purposes of illustrating preferred and various embodiments of the disclosure only and not for purposes of limiting the same, FIGS. 1-11B illustrate a self-contained painting apparatus 10 as may be used for applying a coating material 106 to one or more member surfaces 31 of one or more members 30. The members 30 may be provided in any size, shape or configuration without limitation. For example, the members 30 may be provided as elongate members 30 such as fasteners having fastener heads 32 which may comprise the member surface 31 to which the coating material 106 may be applied. The painting apparatus 10 is adapted to apply the coating material 106 to one or more of the member surfaces 31 of the members 30 in a controlled environment and in an automated manner as illustrated in FIGS. 12A-12B. The painting apparatus 10 may also be operative to apply various types of coating materials 106 such as paint to the member surfaces 31 of a relatively large quantity of members 30. However, the painting apparatus 10 may be employed to applying coating materials 106 to one or more member surfaces 31 of a single member 30.

The painting apparatus 10 may include a portable housing 12 for containing at least one spraying device 102 (e.g., spray gun) that may be movably mountable on a cross beam 84. The cross beam 84 may be movably mounted on one or more slide rails 110. In this regard, the cross beam 84 may be mounted on a single one of the slide rails 110. The cross beam 84 may optionally be mounted on a spaced pair of the slide rails 110. The slide rail(s) 110 may be fixedly mounted to the housing 12. The spraying device 102 may be movable at a predetermined rate along the cross beam 84 and may be driven by any suitable power source such as, without limitation, pneumatic, electrical, hydraulic, mechanical, electro-mechanical, hydro-mechanical power and/or the cross beam 84 may be manually-driven. For pneumatic power, the painting apparatus 10 may include an air motor 90 for driving the cross beam 84 using a variety of different drive mechanisms such as belt drive, screw drive, chain drive and any other suitable mechanism. The cross beam 84 may likewise be driven along the slide rails 110 using any suitable power source such as mentioned above with regard to the spraying device 102. For a pneumatically driven cross beam 84, the painting apparatus may include one or more air motors 90 to drive the cross beam 84 along the slide rails 110 using a suitable drive mechanism such as, without limitation, belt drive, screw drive and chain drive or a variety of alternative drive mechanisms.

The cross beam 84 may be selectively positionable along the slide rails 110 at one or more rack positions 114 corresponding to one or more rack assemblies 38 that may be mounted within the housing 12. Each one of the rack assemblies 38 may contain one or more members 30 such as fasteners 142 that may be loaded onto the rack assembly 38. The members 30 are preferably oriented such that the member surfaces 31 of the members 30 are exposed to receive coating material 106 that may be sprayed from the spraying device 102. Each one of the rack assemblies 38 may be adapted to mount a plurality of the members 30 such as up to several hundred or more members 30. The housing 12 may be adapted to receive a plurality of the rack assemblies 38 such as up to five rack assemblies 38 although the housing 12 may be adapted to receive any number of rack assemblies 38.

The spraying device 102 may be movable along the cross beam 84. The movement of the spraying device 102 may be adjustable with regard to sweep rate (i.e., speed of the spraying device 102 along the cross beam 84) and standoff distance between the spraying device 102 and the member surfaces 31 of the members 30. A lifting mechanism 72 may optionally be included with the painting apparatus 10 in order to separate the member surfaces 31 such as fastener 142 heads 32 from the rack assemblies 38 following application of the coating material 106 (e.g., paint). The lifting mechanism 72 may prevent bridging of the coating material 106 between the member surface 31 and the rack assembly 38. The lifting mechanism 72 may eliminate the occurrence of cured paint film flash extending beyond the perimeters of the member surfaces 31 (e.g., heads 32) when the members 30 (e.g., fasteners 142) are removed from the rack assembly 38.

The technical effects of the disclosed embodiments include an increase in accuracy with which the film thickness of the coating material 106 is applied to the member surfaces 31 due to the automated movement of the spraying device 102 along the cross beam 84. Furthermore, the housing 12 may be enclosable to form an environmentally-controllable chamber 22 such that the temperature and/or humidity may be selectively controlled during application of the coating material 106. In addition, the environmentally-controllable chamber 22 may facilitate curing of the coating material 106 under optimal temperature and/or humidity conditions. In this manner, the painting apparatus 10 may result in an improvement in adhesion of the coating material 106 to the member surfaces 31 as well as an improvement in the appearance of the coated member surfaces 31 (e.g., no runs, sags or wrinkles in the coating surface).

Figure 1:
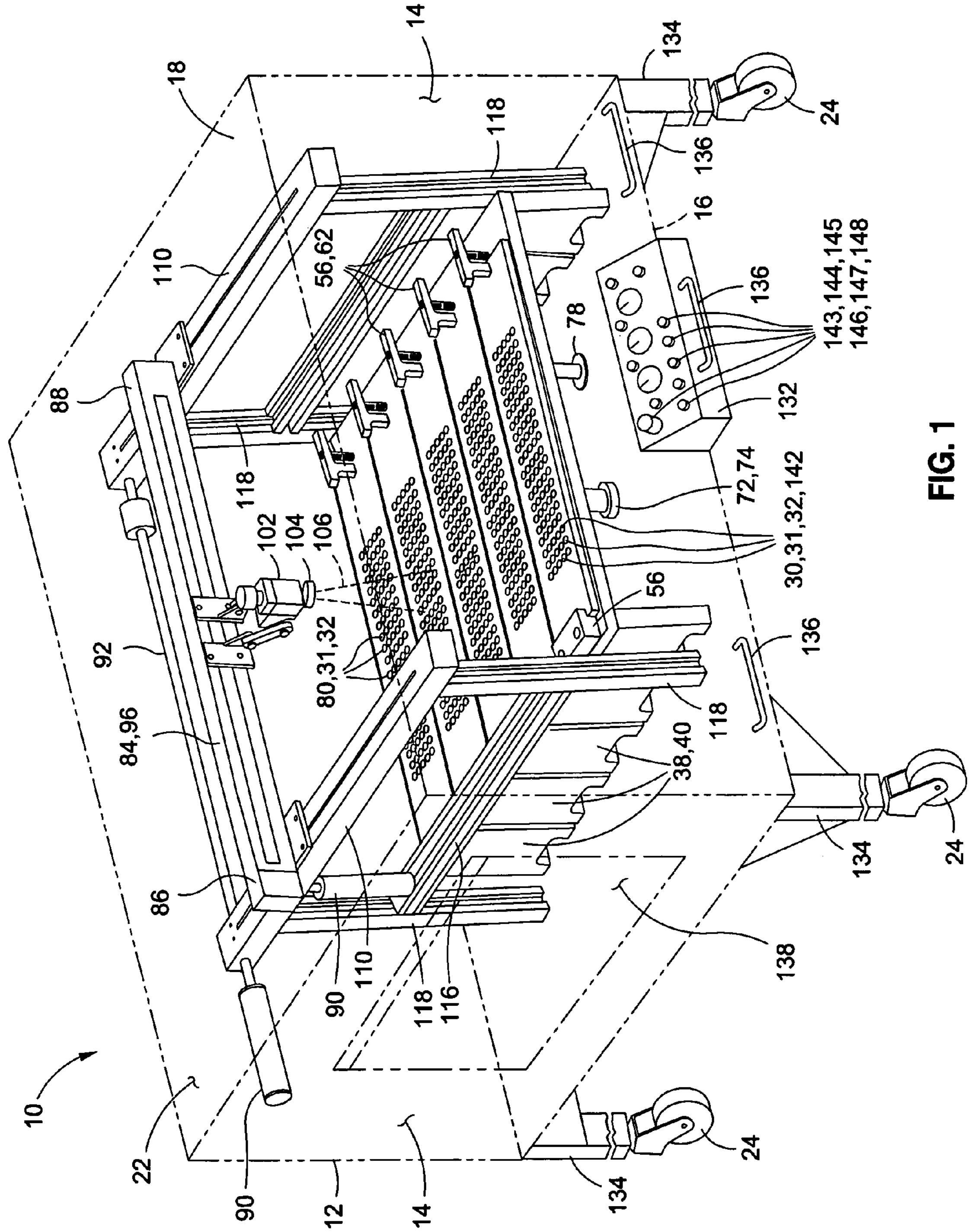
FIG. 1 is a perspective illustration of a painting apparatus in one embodiment including a housing having a plurality of rack assemblies mounted therein and further illustrating a pair of slide rails mounted in the housing for supporting a movable cross beam having a spraying device mounted thereto.
Figure 9:
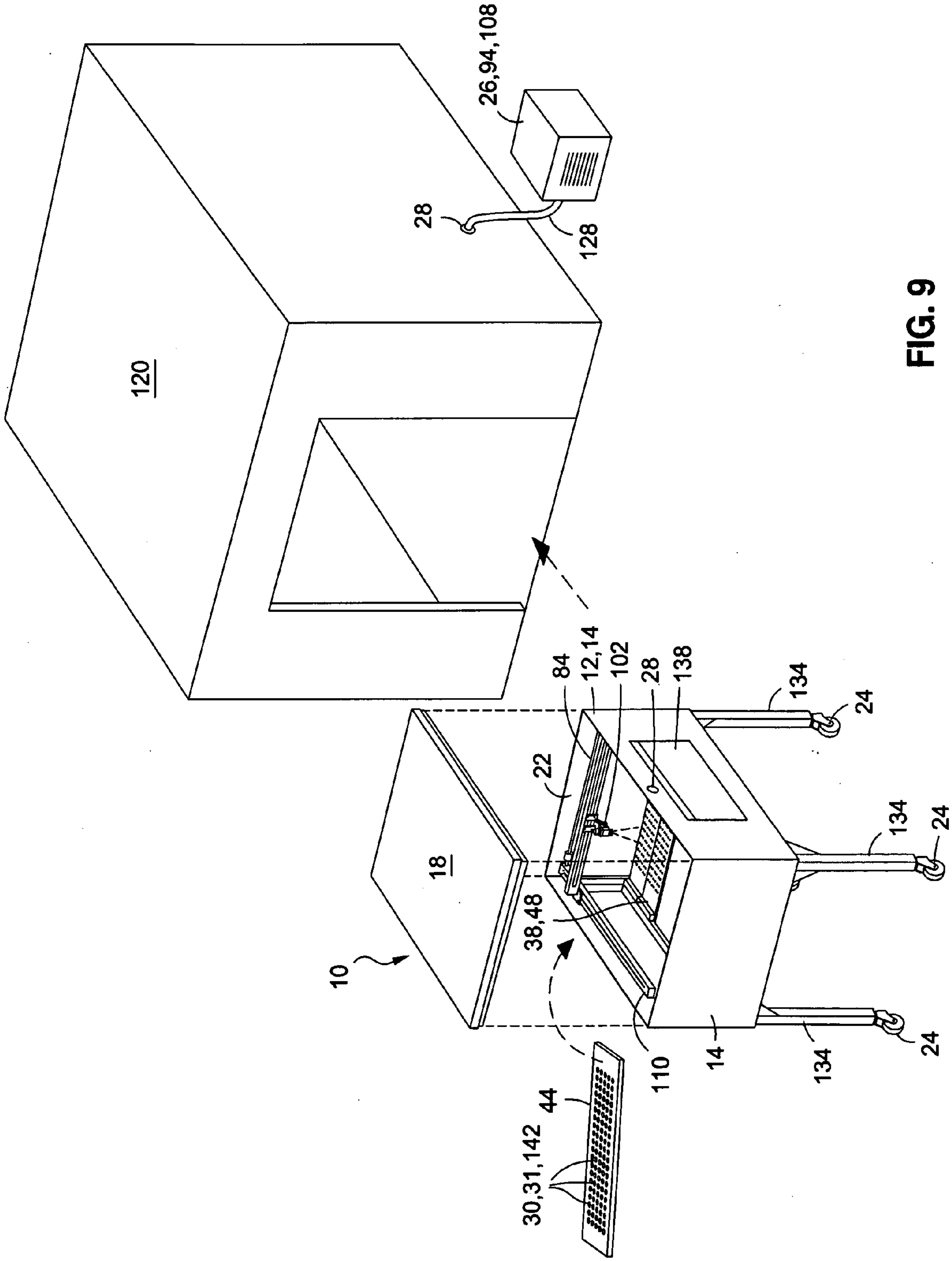
FIG. 9 is a perspective illustration of the painting apparatus prior to positioning within a paint booth for spraying of the coating material.

Referring briefly to FIGS. 1 and 9, the housing 12 may be enclosable using at least one openable or removable door 138 and/or lid 18 in order to form an environmentally-controllable chamber 22. As can be seen in FIG. 1, the housing 12 may include one or more doors 138 located on one or more side walls 14 or on a top side of the housing 12. The doors 138 may be pivotally mounted to the housing 12. Furthermore, the housing 12 may optionally include one or more lids 18 that may be removably mounted to the housing 12 as shown in FIG. 9 although the doors 138 or lids 18 may be hingedly mounted to the housing 12.

As is illustrated in FIGS. 1, 3-6 and 9-10, in one embodiment, the painting apparatus 10 may include a pressurized air source 26 that may be located remotely from the housing 12 and which may be fluidly connectable to the housing 12 via one or more conduits 128. The air source 26 may be operative to control the chamber 22 environment by delivering conditioned air to the chamber 22 to maintain the temperature and/or relative humidity of the chamber 22 at a predetermined level and which is preferably an appropriate temperature and/or relative humidity for application of the coating material 106 to the member surfaces 31 of the members 30.

In addition, the air source 26 is preferably operative to maintain the temperature and/or relative humidity of the chamber 22 at an appropriate level during curing of the coating material 106 which may be different than the temperature and humidity level required for application of the coating material 106. In one embodiment, the air source 26 may be operative to maintain the temperature between approximately 55 and 95 degrees Fahrenheit and the relative humidity between approximately 20 and 70 percent although the air source 26 may be operative to maintain the chamber 22 at any temperature and/or at any relative humidity level.

The painting apparatus 10 may be adapted for applying coating materials 106 of any composition and is not limited to the application of paint. For example, the painting apparatus 10 may be used for the application of primers, lacquers, varnishes, sealants, and various other compositions. Although adapted for applying coating materials 106 to a wide variety of members 30 of different shape and size as mentioned above, the painting apparatus 10 is described and illustrated in the context of applying paint to fasteners 142 which may be of any size, shape and configuration without limitation. For example, the fasteners 142 may be configured as bolts, screws, rivets, nails, shear pins, clevis pins, studs and any other type of elongate member 30 having the head 32 and, optionally, a shaft 34 as shown in FIGS. 2, 4-5 and 7-8.

Furthermore, although the painting apparatus 10 is adapted for applying coating materials 106 to any member surface 31 of any member 30 such as to a top surface of the heads 32, the painting apparatus 10 may apply the coating materials 106 such as paint to other surfaces such as side surfaces of the heads 32 and to tool recesses formed in fastener 142 heads 32 (e.g., Phillips screw drive recess). Advantageously, because of the manner in which the members 30 may be mounted in the rack assembly 38, application of the coating materials 106 may be limited to the exposed member surfaces 31 such as the surfaces of the fastener heads 32 in order to minimize or prevent overspray of coating material 106 onto areas such as on non-exposed sides of a member or on the shaft 34 or an underside of the heads 32 of a fastener 142.

Figure 2:
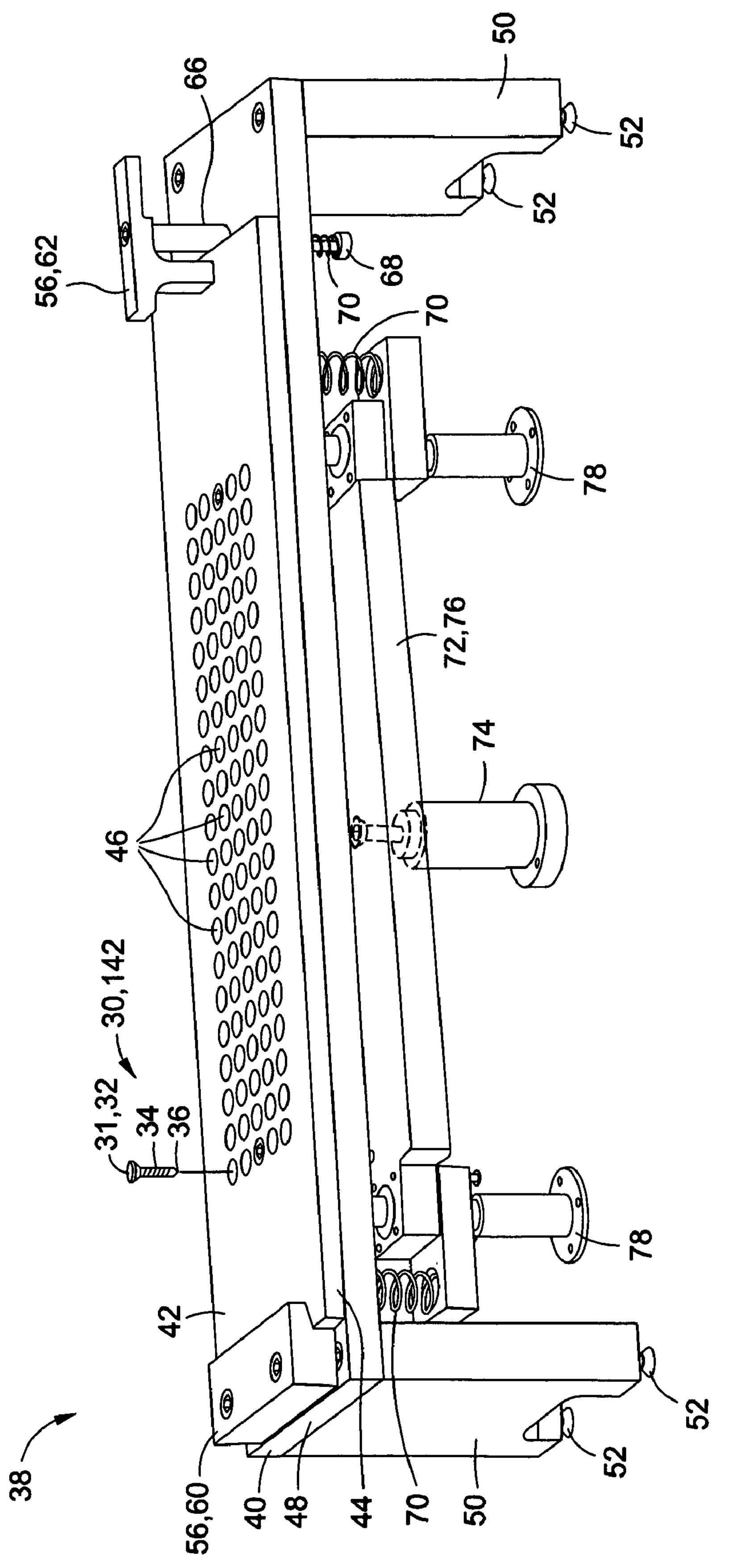
FIG. 2 is a perspective illustration of a rack assembly for mounting a plurality of members such as fasteners each having at least one member surface such as a top surface of a fastener head.
Figure 4:
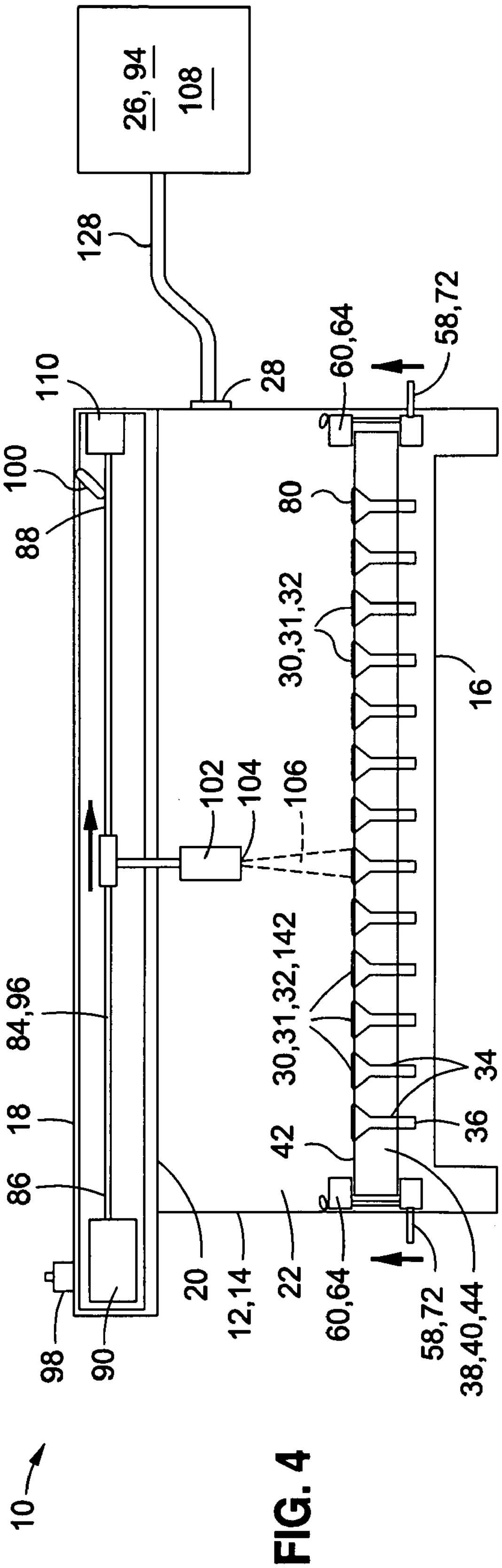
FIG. 4 is a side schematic illustration of the spraying device spraying a coating material onto the heads of the members in a coating application position.
Figure 5:
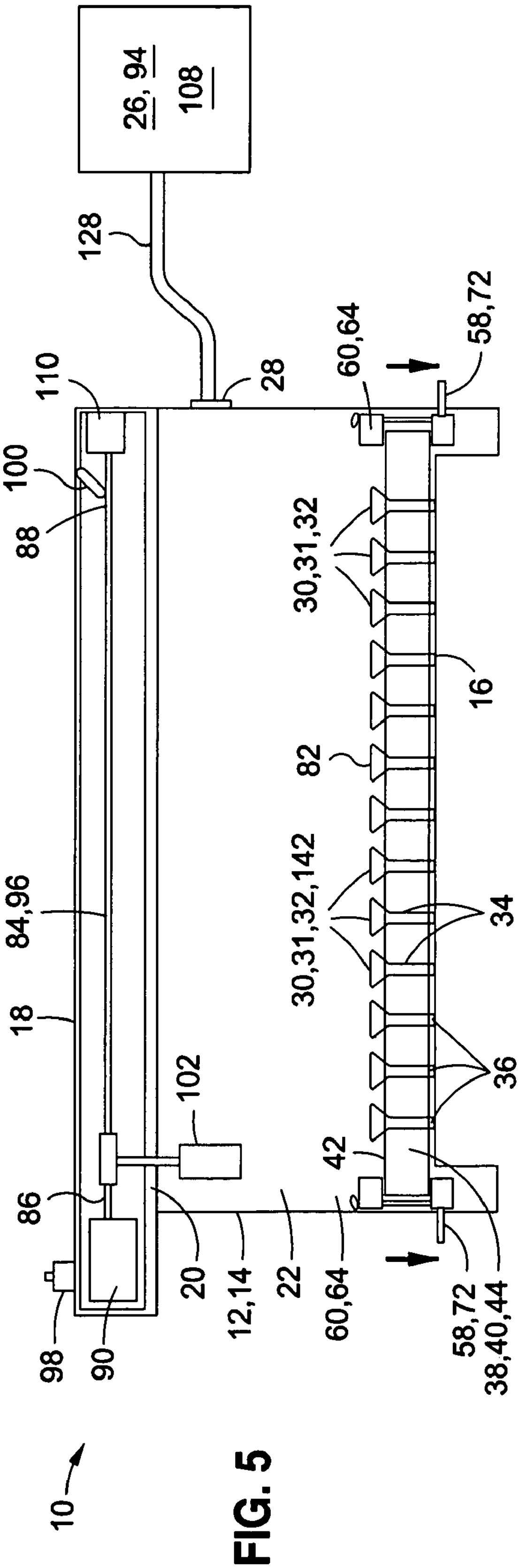
FIG. 5 is a side schematic illustration of the members in a curing position wherein the heads are shown as being separated from an upper surface of the rack assembly.

Referring to FIGS. 2 and 4-5, for embodiments where the member 30 is configured as a fastener 142, the head 32 of each member 30 may be of a larger size or width (e.g., diameter) than the width (e.g., diameter) of the shaft 34 such that the members 30 may be suspended by one of the apertures 46 in the rack assembly 38. In this regard, each one of the apertures 46 may be configured such that an underside of the member surface 31 (e.g., an underside of the head 32) of each member 30 (e.g., fastener 142) may be supported on the upper surface 42 of the rack assembly 38 such as on the upper surface 44 of a panel 44 of the rack assembly 38 as best seen in FIG. 2. The rack assembly 38 may include at least one and, more preferably, a plurality of apertures 46 through which a corresponding plurality of member 30 shafts 34 may be inserted.

The apertures 46 may be formed in the rack assembly 38 and/or in the panel 44 as a pattern of holes although slots or other aperture 46 configurations may be provided. The hole pattern may be uniformly or non-uniformly distributed throughout the panel 44 or rack assembly 38. The apertures 46 may have a circular cross section although other cross sections are contemplated. The apertures 46 may be sized and configured complementary to the size and shape of the members 30 such as fasteners 142 that may be mounted in the apertures 46. For example, FIGS. 2 and 4-5 illustrate fasteners 142 having countersunk heads 32 installed in a plurality of apertures 46 formed in each of the panels 44 and/or rack assemblies 38 if no panel 44 is provided. The shaft 34 of each member 30 may be inserted into a corresponding one of the apertures 46 such that the member 30 is suspended in a vertical orientation with the member surface 31 or top surface of the member 30 or head 32 being exposed to the spraying device 102. In this manner, the shaft 34 and the underside of the member 30 or head 32 may be protected from overspray.

FIGS. 4-5 also illustrate an optional overspray enclosure 20 which may be installed under the cross beam 84 or at least partially surrounding the cross beam 84 to protect the drive mechanism of the spraying device 102 from coating material 106. The drive mechanism may comprise a screw drive 96 arrangement wherein the spraying device 102 may be mounted to a threaded collar 68 which, in turn, may be threadably engaged to an elongate threaded drive screw extending between the slide rails 110. However, alternative mechanisms for driving the spraying device 102 along the cross beam 84 may be employed including, without limitation, belt drive, chain drive, rack and pinion, or any other suitable drive mechanism. As was earlier indicated, the drive mechanism for the spraying device 102 may be pneumatically powered such as by means of a pneumatic circuit 140 as illustrated in one embodiment in FIGS. 11A-11B and described in detail below. The pneumatic circuit 140 may include one or more air motors 90 as illustrated in FIGS. 1 and 3-5 although alternative mediums for driving the spraying device 102 are contemplated.

Figure 3:
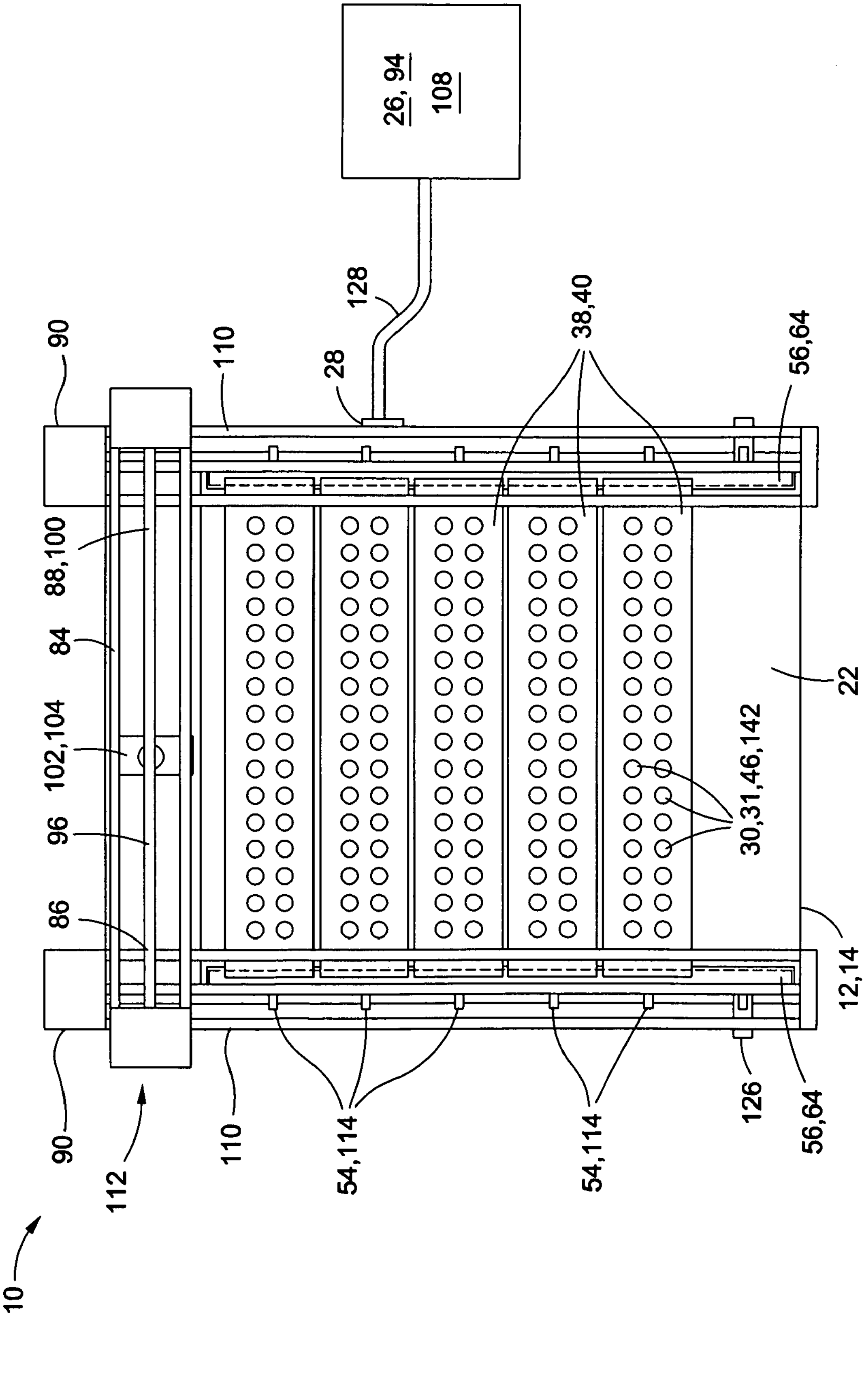
FIG. 3 is a top schematic illustration of the painting apparatus and illustrating the rack assemblies mounted at one of a plurality of rack positions.

Referring to FIGS. 3-5, shown is the painting apparatus 10 having activation switch 98 mounted thereto for initiating operation of the painting apparatus 10. The activation switch 98 may be configured as a pneumatic solenoid mounted on the housing 12 such as on an exterior side thereof although a variety of alternative activation switch configurations are contemplated for mounting at any suitable location. The activation switch 98 may be manually-activatable and may be operative to initiate movement of the cross beam 84 along the slide rails 110. In this regard, the activation switch may initiate an automated sequence of steps for applying coating material 106 onto the member surfaces 31 of members 30 such as fasteners 142 that may be loaded into the rack assemblies 38 as described in greater detail below. However, operation of the painting apparatus 10 may also be manually controlled using one or more switches 143-148 included in the pneumatic circuit 140 as shown in FIGS. 11A-11B and as described in greater detail below.

As shown in FIG. 3, the cross beam 84 may move from a home position 112 to a nearest one of the rack positions 114 or from a rack position 114 to another one of the rack positions 114. After stopping at each one of the rack positions 114, the spraying device 102 may then be moved along the cross beam 84 from a first position 86 on one end of the cross beam 84 to a second position 88 on an opposite end of the cross beam 84. The spraying device 102 may further be caused to spray the coating material 106 onto the member surfaces 31 of the members 30 while the spraying device 102 sweeps across the rack assembly 38. It is further contemplated that the spraying device 102 may be caused to sweep across any length of the cross beam 84 such as along a partial length of the cross beam 84 or along a full length thereof after which the spraying device 102 may optionally return to the first position 86.

The movement of the spraying device along the cross beam 84 may occur automatically as part of a preprogrammed sequence initiated by activation of the activation switch 98. However, as indicated above, in an alternative mode of operation, the painting apparatus 10 may be controlled by manipulation of one or more switches such as using switches 143-148 shown in FIGS. 11A-11B. For example, movement of the spraying device 102 along the cross beam 84 may be manually commanded by activation of a move-across switch 145 shown in FIG. 11B. In this regard, each time the move-across switch 145 is activated such as by depressing a pushbutton of the move-across switch 145, the spraying device 102 is driven across the cross beam 84 while spraying coating material 106. Likewise, movement of the cross beam 84 along the one or more slide rails 110 from rack position 114 to rack position 114 may be commanded when an operator activates a move-up switch 143 or a move-down switch 144 as shown in the pneumatic circuit of FIG. 11A.

Referring still to FIG. 3-5, the cross beam 84 may include one or more limit switches 100 at one or both of the first and second positions 86, 88 although FIGS. 4-5 illustrate a limit switch 100 installed at the second position 88. The limit switch 100 may be configured as a toggle switch. However, the limit switch 100 may be configured in any other suitable configuration such as a sensor that is operative to sense the presence of the spraying device 102 at the first and/or second positions 86, 88. The limit switch 100 may be further operative to cause the spraying device 102 to stop moving across the cross beam 84 and/or to stop the spraying the coating material 106 and/or to reverse the direction of the spraying device 102 and cause the spraying device 102 to move back toward the first position 86.

The limit switch 100 located at the first position 86 may stop the movement of the spraying device 102 and/or to stop the spraying of the coating material 106 as the spraying device 102 returns from the second position 88. After the cross beam 84 is returned to the first position 86, the cross beam 84 may then be caused to move to the next nearest rack position 114 wherein the above-described sequence of spraying of coating material 106 and movement of the cross beam 84 to the next nearest rack position 114 may be repeated.

The above-described steps may be repeated until the cross beam 84 encounters a no-rack stop 126 which may be mounted on at least one of the slide rails 110 as shown in FIG. 3. The no-rack stop 126 may indicate the absence of one of the rack assemblies 38 or the absence of a panel 44 of the rack assembly 38 at the rack position 114. Upon encountering the no-rack stop 126, the cross beam 84 may be moved back to the home position 112 whereafter additional steps may occur depending upon the need to apply additional coats of coating material 106 to the member surfaces 31 or whether a different type of coating material 106 is to be applied to the member surfaces 31. If no further coats are to be applied, a lifting mechanism 72 may optionally be manually or automatically activated to facilitate the separation of the member surfaces 31 (e.g., heads 32) from the upper surfaces 42 of the panels 44 or rack assemblies 38 as shown in FIGS. 2, 4 and 5 and described in greater detail below.

Referring to FIGS. 1 and 3-5, the painting apparatus 10 may include at least one of the spraying devices 102 which may be provided with a spray head 104. The spraying device 102 may be configured as a paint gun as known in the art or in any other suitable configuration for discharging coating material 106. The spraying device 102 is operative to spray the coating material 106 onto the exposed member surface 31 of one or more members 30 that may be loaded into the rack assemblies 38. The rack assemblies 38 are preferably fixedly mountable within the housing 12 but, optionally, may be removably mounted in the housing 12. Each one of the rack assemblies 38 may preferably include one of the panels 44 which may be removably mountable to the rack assembly 38. As was mentioned above, each one of the panels 44 may have a plurality of apertures 46 for receiving the members 30. The members 30 may be loaded into each panel 44 after which the member surfaces 31 may be cleaned or otherwise prepared to receive the coating material 106. Each panel 44 may be loaded onto one of the rack assemblies 38 in the housing 12 such as by manual loading as shown in FIG. 9. The panel 44 may be mounted onto a base plate 48 of the rack assembly 38 and may be removably secured to the base plate 48 by means of one or more clamping mechanisms 56 as will be described in greater detail below.

Referring to FIGS. 1 and 9, the housing 12 is shown as being comprised of a floor 16 having side walls 14 extending upwardly therefrom to form a rectangular or square configuration although other shapes are contemplated. The housing 12 may include the removable lid 18 and/or one of more pivotable doors 138 to facilitate loading of the panels 44 onto the rack assemblies 38. However, other mechanisms are contemplated to facilitate access to the chamber 22 as is required for loading of the panels 44. After the panels 44 are loaded onto the rack assemblies 38 in the housing 12, the lid 18 may be installed and/or the door(s) 138 may be closed on the housing 12 to form the chamber 22.

In one embodiment, the housing 12 may be constructed without extensive regard to sealing which may simplify construction and reduce cost. In this regard, the housing 12 may be configured such that some degree of leakage from the chamber 22 may occur. In consideration of such leakage, the painting apparatus 10 may be preferably positioned inside of a paint booth 120 as shown in FIG. 10 at least during spraying of the coating material 106 for health and safety reasons. The housing 12 may be mounted on legs 134 which may be positioned at suitable locations on the housing 12 such as at the corners of the housing 12.

Wheels 24 such as castoring wheels 24 may be mounted at lower ends of the legs 134 to facilitate transportability of the painting apparatus 10 as shown in FIGS. 1 and 9. For example, the wheels 24 may facilitate positioning the painting apparatus 10 inside of the paint booth 120 as shown in FIGS. 9-10. One or more handles 136 may be mounted on the housing 12 in order to facilitate positioning of the painting apparatus 10. By spraying the coating material 106 and/or curing the coating material 106 while the painting apparatus 10 is positioned inside the paint booth 120, fumes that may leak from the housing 12 may be captured and filtered in compliance with Occupational Health and Safety Act (OSHA) standards or other requirements.

Referring to FIGS. 1 and 3-5, the painting apparatus 10 may include one or more slide rails 110 such as the pair of slide rails 110 that may be disposed in spaced relation to each other such as on opposing sides of the housing 12. If a single slide rail 110 is provided, the slide rail 110 may be supported inside the housing 12 in any suitable manner such as with one or more rail posts 118 although the slide rail 110 may be affixed to the housing 12 side wall 14 or the slide rail 110 may be supported by other means. The painting apparatus 10 may optionally include a pair of the slide rails 110 which may be mounted on one or more of the rail posts 118 as shown in FIG. 1. The rail posts 118 may extend upwardly from the housing 12 floor 16 although the rail posts 118 may be mounted within the housing 12 using any suitable mounting arrangement. At least one brace 116 may optionally be provided and may extend between each pair of rail posts 118 although the slide rails 110 may be supported by a variety of alternative structural arrangements. At least one and, more preferably, both of the slide rails 110 may include one or more rack positions 114. Each one of the rack positions 114 may include an index stop 54. As best seen in FIG. 3, the index stops 54 may be arranged in spaced relation to one another along the slide rails 110 and may protrude outwardly from the slide rails 110. Each one of the rack assemblies 38 may be positioned within the housing 12 in correspondence to one of the rack positions 114. For example, the rack assemblies 38 may be mounted inside the housing 12 such that each one of the rack assemblies 38 is preferably properly positioned or aligned with respect to one of the index stops 54 on the slide rail 110.

Referring to FIG. 3, the slide rails 110 may optionally include a no-rack stop 126 at one of the rack positions 114. The no-rack stop 126 may be mounted to one of the index stops 54 or may be an extension of one of the index stops 54. The no-rack stop 126 may indicate the absence of a panel 44 or a rack assembly 38 at the rack position 114 occupied by the no-rack stop 126. The no-rack stop 126 may prevent the stopping of the cross beam 84 at the no-rack stop 126 as the cross beam 84 is moved along the slide rails 11O. In this manner, as the cross beam 84 moves from rack position 114 to rack position 114, the presence of the no-rack stop 126 may cause the cross beam 84 to return to a home position 112 instead of stopping at the rack position 114 and moving the spraying device 102 across the cross beam 84 while spraying coating material 106. The home position 112 of the cross beam 84 may be located at an upper end of the housing 12 as illustrated in FIG. 3 and may be a preferred position of the cross beam 84 for cleaning and/or maintenance of the spraying device 102. Although FIG. 3 illustrates the painting apparatus 10 as having a single no-rack stop 126, any number of no-rack stops 126 may be provided. Alternatively, all of the rack positions 114 may be occupied such that none of the rack positions 114 include a no-rack stop 126.

Referring still to FIG. 3, it should be noted that although the index stops 54 and no-rack stops 126 are illustrated and described as being mechanical mechanisms, non-mechanical means may be provided. For example, each index stop 54 may be configured as a sensor (not shown) such as an optical sensor capable of sensing a marker (not shown) that may be mounted on each panel 44 or rack assembly 38 to indicate the existence or lack thereof of a rack assembly at the rack position 114. The sensor may be adapted to sense the relative position of the cross beam 84 as it is driven toward each one of the rack positions 114 and cause the cross beam 84 to stop thereat such that the spraying device 102 may sweep across the cross beam 84 while spraying coating material 106 onto the member surfaces 31 of the members 30 mounted in the rack assembly 38 at that location.

Referring to FIGS. 1 and 3-5, the cross beam 84 may be mounted transversely relative to one or more slide rails 110. The cross beam 84 may be operatively coupled to the slide rail 110 at any location along the cross beam 84. For example, the cross beam 84 may have one end that may be coupled to a single one of the slide rails 110. Optionally, the cross beam 84 may have opposing ends that may be operatively coupled to a pair of the slide rails 110. As indicated above, the cross beam 84 may be moved along the slide rails 110 using any suitable power source including, but not limited to, pneumatic, electrical, hydraulic or mechanical power or various combinations thereof and including a manually-driven cross beam 84. For an embodiment of the painting apparatus 10 driven by pneumatic power, at least one air motor 90 such as a linear air motor may be mounted on at least one of the slide rails 110 such as at one of opposing ends of one or more of the slide rails 110. As was mentioned above, the cross beam 84 may be stopped at each one of the rack positions 114 in order to allow the spraying device 102 to move across the rack assembly 38 at that rack position 114 while the spraying head 32 sprays the coating material 106 onto the member surface 31 of one or more members 30 that may be mounted in the rack assembly 38.

The movement of the spraying device 102 across the cross beam 84 may also be driven by any suitable power source such as, without limitation, the power sources mentioned above with regard to driving the cross beam 84 along the slide rail 110. The use of a non-electrical power source such as pneumatic power to drive the cross beam 84 or the spraying device 102 may avoid the hazards associated with flammable gases or vapors which may be present in the housing 12 during the spraying process. As is known in the art, undesirable effects may occur when gases or vapors are exposed to an electrical source such as electrically-powered motors. Advantageously, by powering the movement of the cross beam 84 and the spraying device 102 with pneumatic power using air motors 90, such undesirable effects may be avoided.

As can be seen in FIGS. 3-6 and 9-10, the painting apparatus 10 may include an air source 26 for delivering pressurized, conditioned air to the chamber 22 via one or more conduits 128 connected to the housing 12 by one or more fittings 28. The fittings 28 may be mounted to a wall 14 of the housing 12 and/or to a wall of the paint booth 120 to facilitate fluid connection of the air source 26 to the housing 12. As was earlier mentioned, the air source 26 is operative to maintain the temperature and/or relative humidity level of the chamber 22 during the application of coating material 106 and during curing of the coating material 106 which may be a different temperature/humidity combination than the temperature/humidity required for application of the coating material 106.

Regarding the movement of the cross beam 84, a torque rod 92 may optionally be included to couple the power source such as the air motor 90 shown in FIG. 1 and which may be coupled to both of the slide rails 110 for moving both ends of the cross beam 84 in unison along the slide rails 110. The painting apparatus 10 may further include a pressure pot 108 for containing the coating material 106 and for delivering the coating material 106 under pressure to the spraying device 102. The pressure pot 108 may be co-located with the air source 26 and the pneumatic source 94 although the pressure pot 108 may alternatively be housed within the housing 12.

Referring to FIG. 2, shown is one of the rack assemblies 38 in an embodiment as may be used in the painting apparatus 10. FIG. 2 illustrates one of the members 30 which may be mounted in the rack assembly 38 and which is configured as a fastener 142 having a countersunk head 32 and having a shaft 34 extending from the head 32. The rack assembly 38 may include the panel 44 having a plurality of the apertures 46 formed therein. The apertures 46 are preferably formed at a size and shape that is complementary to the size and shape of the shaft 34 and/or such that the shaft 34 and the underside of the head 32 is insertable into the aperture 46 leaving the top surface of the head 32 exposed.

The panel 44 may optionally be mounted on a base plate 48 which may have an opening formed therein to accommodate the protrusion of shafts 34 through the apertures 46 in the panel 44. The base plate 48 may be supported by one or more base supports 50 which may be generally vertically-oriented. For example, the base plate 48 may be supported on at least one of opposing ends of the base plate 48. Each one of the base supports 50 may include a pair of height-adjustable feet 52 for supporting the rack assembly 38 in the housing 12. The panel 44 may be removably secured to the base plate 48 at opposing ends of the panel 44 by means of one or more clamping mechanisms 56. In one embodiment, the clamping mechanism 56 may be configured as a clamp block 60 as illustrated in FIG. 2 on a left-hand side of the rack assembly 38 and being attached to the base plate 48 with a pair of mechanical fasteners 142. The clamp block 60 may include a notch or undercut that is preferably sized and configured complementary to the panel 44 thickness such the panel 44 may be received into the undercut.

Referring still to FIG. 2, on a right-hand side of the rack assembly 38, the clamping mechanism 56 may be configured as a T-shaped or L-shaped clamp bar 62 which may be manually-rotatable about a rod 66 that may extend into the base plate 48. The rod 66 may be threadably engaged to a threaded stud extending upwardly from the base plate 48 such that rotation of the threaded stud and/or rotation of the clamp bar 62 causes relative axial motion therebetween which, in turn, causes the clamp bar 62 to clamp the panel 44 against the base plate 48. Alternatively, a threaded collar 68 may be provided on an underside of the base plate 48 to threadably engage the threaded stud extending through the base plate 48. Rotation of the threaded collar 68 relative to the threaded stud causes relative axial motion therebetween and which clamps the panel 44 against the base plate 48.

In yet a further embodiment, the rod 66 may be spring-loaded via a biasing mechanism 70 (e.g., compression spring) located under the base plate 48 such that manually lifting the clamp bar 62 allows for insertion of the panel 44 and release of the clamp bar 62 causes clamping of the panel 44 against the base plate 48 under the biasing force of the compression spring. It should be noted that the above-described embodiments of the clamping mechanisms 56 are representative only and should not be construed as limiting alternative embodiments by which the panel 44 may be clamped or otherwise mounted to the base plate 48.

Referring to FIGS. 3-5, the clamping mechanism 56 may be configured as clamp rails 64 located on opposing sides of the rack assemblies 38. The clamp rails 64 are shown as being generally continuous although segmented clamp rails 64 are contemplated. Each one of the clamp rails 64 may comprise upper and lower portions. The lower portion of the clamp rail 64 may bear against the upper surface 42 of the rack assembly 38 to clamp the rack assembly 38 in position within the housing 12. The upper portion of the clamp rail 64 may be pivotable upwardly away from the rack assembly 38 to allow for removal and installation of the rack assemblies 38.

Referring to FIG. 2, shown in one embodiment is the lifting mechanism 72 disposed on an underside of one of the rack assemblies 38 although each one of the rack assemblies 38 may have a lifting mechanism 72. In the embodiment shown, the lifting mechanism 72 may comprise a lifting plate 76 which preferably extends along a length of the base plate 48 in an area wherein the apertures 46 are formed in the rack assembly 38. The lifting plate 76 may be moved upwardly under the influence of a lifting device such as a pneumatic cylinder or jack 74 which is shown as being located near a center of the lifting plate 76 in FIG. 2. A pair of alignment mechanisms 78 may be located on opposite sides of the jack 74 to support the lifting plate 76 and to guide the upward movement of the lifting plate 76 under the influence of the jack 74 and/or to guide the downward movement of the lifting plate 76 under the influence of gravity when the jack 74 is released and/or is forced downwardly by compression springs which may be co-located with each one of the alignment mechanisms 78.

The lifting plate 76 may be lifted upwardly into contact with the free ends 36 of the shafts 34 such that the member surfaces 31 may be pushed upwardly away from the upper surface 42 of the panel 44 of the rack assembly 38. In this manner, the lifting plate 76 may separate the member surfaces 31 (e.g., heads 32) from the upper surface 42 to prevent paint bridging after the heads 32 have been painted but prior to curing of the paint. Although the lifting mechanism 72 is illustrated and described as a lifting plate 76, it should be noted that such configuration is a representative embodiment and should not be construed as limiting alternative embodiments of the lifting mechanism 72 having the capability to separate the heads 32 from the upper surface 42. Furthermore, although the lifting mechanism 72 is described and illustrated in the context of a fastener 142 head 32, the lifting mechanism 72 may facilitate the separation of member surfaces 31 from the upper surface 42 wherein the members 30 may be provided in a variety of alternative sizes, shapes and configurations as described above.

Referring to FIGS. 4-5, the lifting mechanism 72 may comprise one or more lift levers 58 which may be mounted to the clamp rails 64. The lift levers 58 may facilitate the separation of the heads 32 from the upper surface 42 following application of the coating material 106 to the heads 32. For example, FIG. 4 illustrates the rack assembly 38 in a raised position such that the heads 32 are in a coating application position 80 wherein the heads 32 are in contact with the upper surface 42. In the coating application position 80, the undersides of the heads 32 may be protected from overspray as may the shafts 34.

In FIG. 5, the rack assembly 38 is lowered such that the heads 32 (i.e., member surfaces 31) are in a curing position 83 wherein the heads 32 are lifted or moved away from the upper surface 42. Moving the heads 32 to the curing position 82 may be effected by manually moving the lift lever 58 downwardly such that the floor 16 of the housing 12 comes into contact with the free ends 36 of the shafts 34 of the members 30 forcing the heads 32 upwardly. In this manner, the lift levers 58 provide a means to prevent bridging of the coating material 106 from the head 32 to the upper surface 42 of the rack assembly 38 during curing of the coating material 106.

Figure 6:
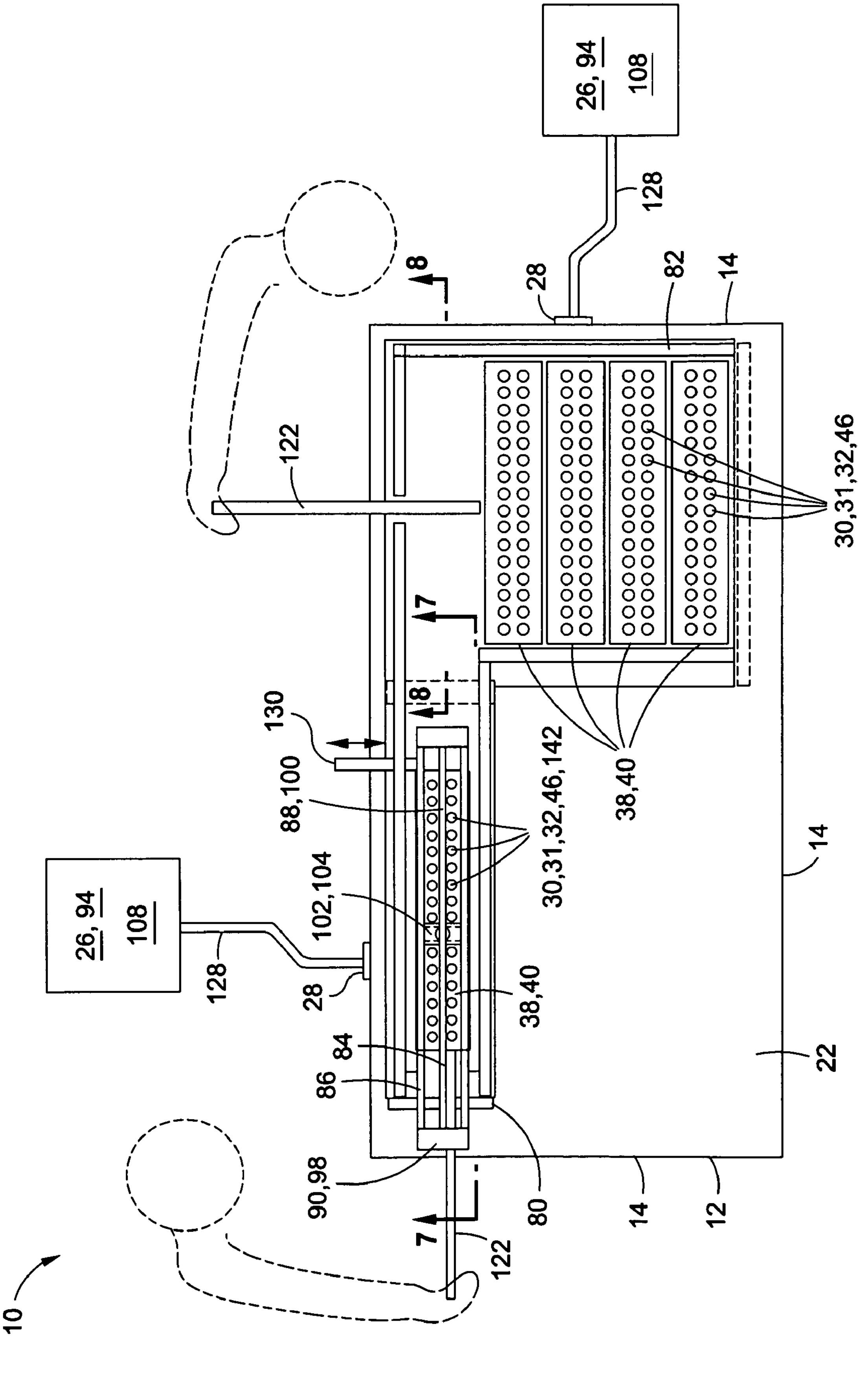
FIG. 6 is a top schematic illustration of the painting apparatus in an alternative embodiment.
Figure 7:
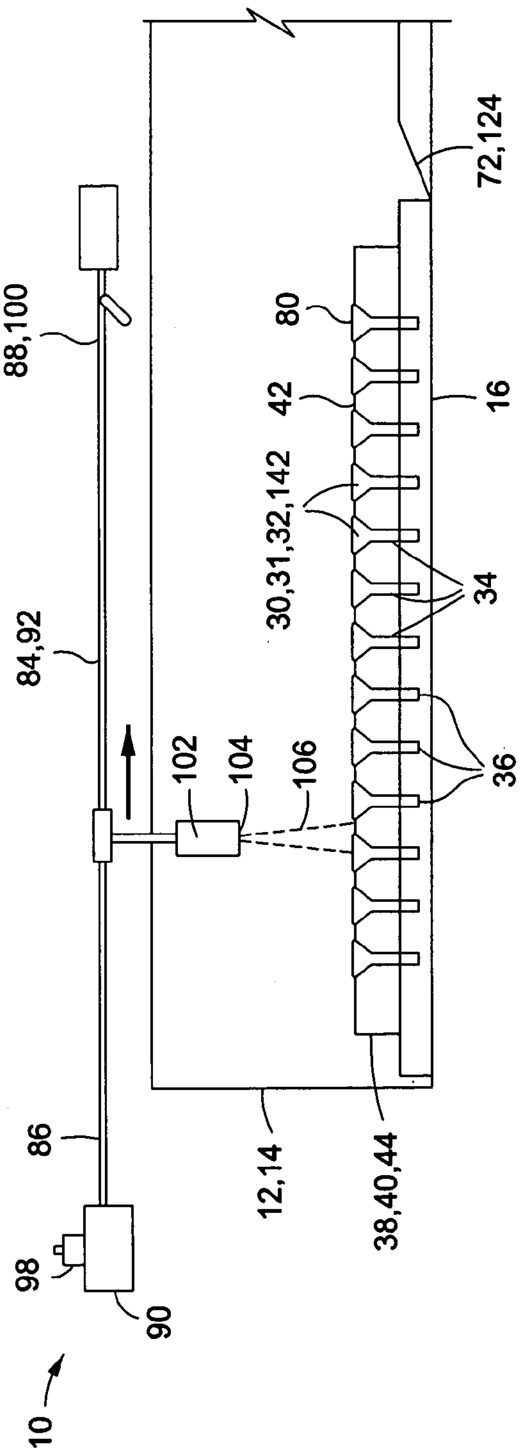
FIG. 7 is a side schematic illustration of the painting apparatus taken along lines 7-7 of FIG. 6 and illustrating the member surfaces resting on the upper surface of the rack assembly in the coating application position.
Figure 8:
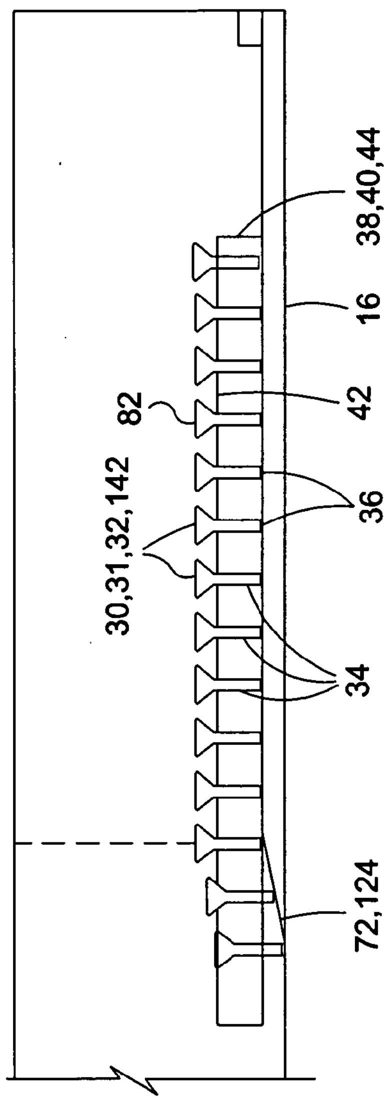
FIG. 8 is a side schematic illustration of the painting apparatus taken along lines 8-8 of FIG. 6 and illustrating the member surfaces being separated from the upper surface of the rack assembly in the curing position.

Referring to FIGS. 6-8, shown is the painting apparatus 10 in an alternative embodiment wherein the spraying device 102 is configured to apply the coating material 106 to the rack assemblies 38 in one-at-a-time fashion. The painting apparatus 10 includes the enclosable housing 12 defining the chamber 22. The spraying device 102 is mounted to the cross beam 84 which is non-movably fixed in position inside the housing 12. As shown FIGS. 6-7, a rack assembly 38 may be loaded into the housing 12. The rack assembly 38 may be configured as a simple panel 44 or a paint rack 40 which may include the plurality of apertures 46 for receiving the shafts 34 of the members 30. The apertures 46 are preferably sized and configured such that the shafts 34 may protrude through the apertures 46 and extend beneath the panel 44 such as into a grooved plate (not shown) that may be mounted below the panel 44. The members 30 may be mounted such that the member surfaces 31 (e.g., heads 32) are flush with the upper surface 42.

The cross beam 84 of the painting apparatus 10 illustrated in FIGS. 6-8 may include first and second positions 86, 88 between which the spraying device 102 may move while spraying the coating material 106 onto the member surfaces 31 such as the heads 32 as illustrated. The activation switch 98 may be mounted on the housing 12 and may be manually-activatable to initiate movement of the spraying device 102 along the cross beam 84 from the first position 86 to the second position 88 while spraying coating material 106. The cross beam 84 may include one or more limit switches 100 at one or both of the first and second positions 86, 88. The limit switch 100 is operative to sense the presence of the spraying device 102 at the second position 88 and/or to cause the spraying device 102 to stop moving, stop the spraying the coating material 106 and/or return the spraying device 102 back to the first position 86 under power from one or more air motors 90 that may be mounted on the cross beam 84.

Referring still to FIGS. 6 and 8, following the application of coating material 106 to the heads 32, a gate 130 may be opened allowing the rack assembly 38 to be pushed toward a curing position 82 of the housing 12 such as by using a push rod 122. In the embodiment shown in FIG. 6, the push rod 122 is shown as extending exteriorly from the housing 12 such that an operator may manually push the rack assembly 38 out from underneath the cross beam 84 after which the rack assembly 38 may be pushed aftwardly using the push rod 122 toward a stack of rack assemblies 38 holding coated members 30 as shown in FIG. 6.

The lifting mechanism 72 for the painting apparatus 10 illustrated in FIGS. 6-8 may comprise a ramp 124 disposed on a floor 16 of the housing 12 and which causes the member surfaces 31 of the members 30 to be lifted or moved away from the upper surface 42 of the rack assembly 38 as the rack assembly is moved over the ramp 124. In this manner, the free ends 36 of the shafts 34 contact the ramp 124 and are forced upwardly. However, other lifting mechanisms 72 may be implemented into the painting apparatus 10 illustrated in FIGS. 6-8.

Referring to FIG. 6, the painting apparatus 10 may include one or more of the air sources 26 for delivering conditioned air to the chamber 22 via one or more conduits 128 that may be connected to the housing 12 via one or more fitting 28. The air source 26 may also serve as the pneumatic source 94 of pressurized air for powering the air motors 90 which may drive the spraying device 102 along the fixedly-mounted cross beam 84 shown in FIGS. 6-7. The paining apparatus 10 may include a pressure pot 108 for containing the coating material 106. The pressure pot 108 may be pressurized by the air source 26 and/or the pneumatic source 94 to discharge the coating material 106 from the spray head 104 for application to the member surfaces 31 of the members 30.

Referring to FIG. 11 which comprises FIGS. 11A-11B, shown is one embodiment of a pneumatic circuit 140 for delivering pressurized or compressed air to the painting apparatus 10. The pneumatic source 94 such as a compressor (not shown) may be included to provide compressed air to the pneumatic circuit 140. The pressurized air may be routed through various control valves in the pneumatic circuit 140 for activating the air motors 90 for driving the movement of the cross beam 84 and the spraying device 102. In addition, the pneumatic circuit 140 may be configured to provide compressed air to the lifting mechanism 72 such as to the pneumatic cylinders or jacks 74 which may be located beneath each one of the rack assemblies 38 for forcing the member surfaces 31 (e.g., heads 32) away from the upper surfaces 42 of the rack assemblies 38.

The pressurized air may be delivered to the spraying device 102 in order to discharge coating material 106 from the spray head 104 as shown in FIGS. 11A-11B. Limit switches 100 may be located at the opposing ends of the cross beam 84 (i.e., at the first and second positions 86, 88) to stop movement of the spraying device 102 and to stop the spraying of coating material 106. One of the limit switches 100 at the second position 88 may be a reversing-type limit switch 100 to cause the spraying device 102 to automatically return to the first position 86. The slide rails 110 may optionally include at least one limit switch 100 to halt the movement of the cross beam 84 along the slide rails 110. In addition, the pneumatic circuit 140 is preferably configured to facilitate the positioning of the cross beam 84 at one of the plurality of rack positions 114 associated with the slide 18 beams.

Referring to FIGS. 1, 3 and 11A-11B, a control panel 132 may be included with the painting apparatus 10 and may be mounted on the housing 12 as shown in FIG. 1 or at other suitable locations. The painting apparatus 10 may include a number of switches in addition to the limit switches 100. For example, as mentioned above, the pneumatic circuit 140 may include switches to facilitate manual or semi-automatic control of the movement of the cross beam 84 and/or spraying of coating material 106 by the spraying device 102. The switches may be mounted on the control panel 132 or at alternative locations on the housing 12 and may be provided in a variety of configurations such as push-buttons, levers, dials, pneumatic solenoids or other switch configurations.

More particularly and referring to FIGS. 3 and 11A, the switches may include a move-down switch 144 and a move-up switch 143 for controlling movement of the cross beam 84 along the slide rails 110 between rack positions 114. The move-down switch 144 and move-up switch 143 may be configured such that each time the switch 143, 144 is actuated such as by depressing a button, the switches 143, 144 activate the air motor 90 causing movement of the cross beam 84 such as to a nearest rack position 114. For example, an operator may actuate the move-down switch 144 to cause the cross beam 84 to move from the home position 112 to the nearest rack position 114 or to another rack position 114. The move-up switch 143 may be actuated to cause the cross beam 84 to move back to the home position 112 or to another rack position 114. In this manner, the move-up and move-down switches 143, 144 allow the operator to command incremental movement of the cross beam 84 between a plurality of rack positions 114.

As shown in FIG. 11A, the painting apparatus 10 may further include a move-across switch 145 which may be configured as a pushbutton or as any other suitable switch configuration by which an operator may command the spraying device 102 to move along the cross beam 84. As described above with respect to the automated movement of the painting apparatus 10, actuation of the move-across switch 145 may also cause the spraying device 102 to spray the coating material 106 while the spraying device 102 moves along the cross beam 84 from the first position 86 toward the second position 88. Upon arriving at the second position 88, the limit switch 100 may be actuated causing the spraying device 102 to reverse direction and move back toward the first position 86. Actuation of the limit switch 100 at the second position 88 may further cause the spraying device 102 to stop the spraying of the coating material 106 from the spray head 104.

A test-spray switch 146 may further be included in the pneumatic circuit 140 as shown in FIG. 11B. The test-spray switch 146 may allow an operator to trigger the spraying of coating material 106 from the spray head 104 without causing movement of the spraying device 102 along the cross beam 84. In this manner, the test-spray switch 146 may allow an operator to verify that the spraying device 102 is in proper working order prior to actuating the move-across switch 145 which causes the spraying of coating material 106 onto the member 30 heads 32. Optionally included with the switches may be an emergency-stop switch 148 as shown in FIG. 11A and which, when actuated, stops movement of the spraying device 102 and stops the spraying of the coating material 106 from the spray head 104 regardless of the position of the spraying device 102.

A fastener-eject switch 147 may be included in the pneumatic circuit 140 as shown in FIG. 11B. The fastener eject switch 147 may be operator-actuated to engage the lifting mechanism 72 as shown in FIGS. 2, 4 and 5. As described above, actuation of the lifting mechanism 72 facilitates the separation of the member surfaces 31 such as the heads 32 from the upper surfaces 42 of the panels 44 and/or of the rack assemblies 38 to prevent bridging of the coating material 106 between the head 32 and the panel 44. Using the above-described switches 143-147, an operator may position the cross beam 84 at any one of the rack positions 114 along the slide rails 110. In addition, the operator may initiate the movement of the spraying device 102 along the cross beam 84 while the coating material 106 is sprayed from the spray head 104 and onto the member surfaces 31.

In one embodiment for operating the painting apparatus 10, an operator may mount a plurality of the members 30 into the panels 44 and/or rack assemblies 38 by inserting the shafts 34 of the members 30 into the apertures 46. The heads 32 may be cleaned in a manner as described above. The operator may load the panel 44 into one of the rack assemblies 38 mounted in the housing 12 and may clamp the panel 44 to the rack assembly 38 using one of the clamping mechanisms 56. A test of the spraying device 102 may be commanded by actuating the test-spray switch 146 prior to initiating movement of the spraying device 102 along the cross beam 84.

By actuating the move-across switch 145, the spray head 104 may spray the coating material 106 onto the member surfaces 31 of the members 30 loaded in the rack assembly 38 at that rack position 114 as the spraying device 102 moves from the first position 86 toward the second position 88 on the cross beam 84. Following the spraying of coating material 106 and return of the spraying device 102 to the first position 86, the operator may actuate the move-up or move-down switch 143, 144 to move the cross beam 84 to the next nearest rack position 114. The move-across switch 145 may again be actuated by the operator and the process repeated until all the member surfaces 31 of the members 30 in all the rack assemblies 38 are coated (e.g., painted). Additional or different coats of coating material 106 may be applied as described above using the combination of switches 143-148.

Referring to FIGS. 12A-12B, shown is an exemplary methodology for applying the coating material 106 to the member surfaces 31 of the members 30. Although the methodology is described below in the context of fasteners 142 such as bolts, screws and rivets, the methodology may be applied to other types of members 30 other than fasteners 142 having a head 32 and a shaft 34. In this regard, as was indicated above, the members 30 may be provided in a wide variety of different shapes and sizes and having one or more member surfaces 31 to which coating material 106 may be applied. Furthermore, although the coating material 106 is described in the methodology as comprising paint, the coating material 106 may be provided in a wide variety of alternative coating materials 106 other than paint.

Referring to FIGS. 2 and 12A, step 150 of the method may comprise loading one or more of the members 30 into one or more rack assemblies 38 or panels 44 thereof such that the shafts 34 extend through the apertures 46 with the heads 32 of each one of the fasteners 142 being exposed. The fasteners 142 may be loaded such that the underside of each one of the fasteners 142 is supported on the upper surface 42 of the panel 44. Step 152 may comprise the optional step of cleaning the fastener 142 heads 32 or otherwise preparing the surfaces of the heads 32 for receiving paint. The cleaning process may comprise solvent-wiping the heads 32 followed by wiping the head 32 with a clean, dry wiper cloth to remove contamination from the heads 32. The cleaning process may be performed when the panels 44 are located outside of the housing 12 or when the panels 44 are mounted within the housing 12.

Referring to FIGS. 1, 3, 9, 11A-11B and 12A, step 154 may comprise loading the panels 44 onto the rack assemblies 38 that are mounted in the housing 12 at the rack positions 114 associated with the slide rails 110. The rack assemblies 38 may be indexed or centered or otherwise aligned with respect to the index stops 54 that may be provided with the slide rails 110. For rack positions 114 wherein the panel 44 is not loaded onto the rack assembly 38 or where the rack assembly 38 is absent, a no-rack stop 126 may be provided on the slide rail 110.

The housing 12 may be enclosed with the lid 18 and/or door 138 to form the chamber 22. The air source 26 may be activated to deliver conditioned air to the chamber 22 at a predetermined temperature and humidity. The air source 26 may be fluidly connected to the painting apparatus 10 using one or more conduits 128 and/or fittings 28 which may be mounted on a side of the paint booth 120 and/or on the housing 12. The painting apparatus 10 may be moved into the paint booth 120 prior to connecting the air source 26/pneumatic source 94. The connection of the air source 26 may also include connecting to the pressure pot 108 if located outside of the paint booth 120.

The painting sequence may be initiated in step 154 by activating the activation switch 98 or by actuating the move-up or move-down switch 143, 144 which may start the movement of the cross beam 84 (i.e., spraying device) such as from the home position 112 to a nearest one of the rack positions 114. The cross beam 84 may be moved along the slide rails 110 toward the nearest rack position 114 until the cross beam 84 is aligned with the rack assembly 38 as may be indicated by the index stop 54. Once the cross beam 84 is positioned at the rack assembly 38, step 156 includes moving the spraying device 102 along the cross beam 84 across a length of the rack assembly 38 from the first position 86 to the second position 88 while spraying the coating material 106 onto the heads 32. The movement of the cross beam 84 and the spraying of coating material 106 from the spraying device 102 may be initiated by actuating the move-across switch 145 as shown in FIG. 11B. As was earlier mentioned, the spraying of the coating material 106 is preferably performed when the housing 12 is located within the paint booth 120.

Step 162 comprises stopping the spraying of the coating material 106 once the spraying devices 102 reaches the second position 88 as may be indicated by the triggering of the limit switch 100. The spraying device 102 may then be returned to the first position 86. Step 164 includes moving the cross beam 84 along the slide rail 110 toward the next nearest one of the rack positions 114 which may be initiated by actuating the move-up or move-down switch 143, 144. The sequence of steps comprising moving the spraying device 102 along the cross beam 84 from the first position 86 to the second position 88 while spraying coating material 106 in step 160 (which may be initiated by actuating the move-across switch 145), stopping the spraying of the coating material 106 and returning the spraying device 102 to the first position 86 in step 162, and moving the cross beam 84 the next nearest one of the rack positions 114 in step 164 may be repeated until the cross beam 84 encounters the no-rack stop 126 in step 166.

If the no-rack stop 126 is encountered by the cross beam 84, then the cross beam 84 may be moved back to the home position 112 in step 168 such as by manipulation of the move-up or move-down switches 143, 144. If additional coats of coating material 106 are required to be applied to the heads 32 in step 170, the previously applied coating material 106 may be allowed to cure for a predetermined period of time prior to spraying of the additional coating material 106 in step 162 or prior to re-initiating steps 156-166. If a different type of coating material 106 is required to be applied to the heads 32 such as an exterior coat to be applied over an intermediate coat or over a primer coat, the coating material 106 in the pressure pot 108 may be changed and the sequence re-initiated following the elapse of an appropriate time period to allow the previously-applied coating material 106 to cure in step 176.

If no additional coating material 106 is to be applied, step 178 comprises initiating separation of the fastener 142 heads 32 from the upper surface 42 of the panel 44 or rack assembly 38. The lifting mechanisms 72 illustrated in FIGS. 2, 4 and 5 and described above may be employed in step 178 to prevent bridging of the coating material 106 between the head 32 and the rack assembly 38 in order to eliminate the occurrence of paint film flash. Step 180 comprises allowing the coating material 106 to flash off for a period of time sufficient to allow the solvent in the coating material 106 to evaporate while the heads 32 are separated from the upper surface 42.

Step 184 comprises allowing the coating material 106 to cure which may further include delivering air to the chamber wherein the air is conditioned with a temperature and humidity that is compatible for curing of the coating material 106. Step 186 comprises removing or opening the lid 18 and/or door 138 from the housing 12 to allow for removal of the panels 44 or rack assemblies 38. The fasteners 142 may then be removed from the panels 44 or rack assemblies 38 in step 188. Another set of unpainted fasteners 142 or other member 30 configurations may then be loaded into the panels 44 or rack assemblies 38 according to the above-described sequence.

Referring to FIGS. 6-8, the process for painting of the fasteners 142 using the embodiment illustrated includes initially moving the painting apparatus 10 inside the paint booth 120 and connecting the air source 26 and/or pneumatic source 94 to the housing 12 via the conduit(s) 128. The air source 26 may be set to deliver pressurized temperature and humidity-controlled air to the chamber 22 suitable for application of the paint. Fasteners 142 may be loaded into panel 44 followed by loading of the panel 44 or rack assembly 38 into the chamber 22 such as by using the push rod 122 illustrated in FIG. 6. As was earlier mentioned, the members 30 are preferably mounted such that the heads 32 are flush with the upper surface 42. Once the panel 44 is loaded, the door 138 and/or lid 18 of the housing 12 may be secured in order to enclose the chamber 22.

Referring still to FIGS. 6-8, the activation switch 98 may be activated to cause the spraying device 102 to be moved along the cross beam 84 while triggering the spraying of the coating material 106 therefrom. The spraying device 102 traverses a length of the rack assembly 38 from the first position 86 toward the second position 88 until activating the limit switch 100 optionally located at the second position 88 and which may stop the movement of the spraying device 102 and stop the spraying of the coating material 106.

The gate 130 as shown in FIG. 6 may be opened to allow the rack assembly 38 to be moved laterally toward a right-hand side of the housing 12 such that the heads 32 are moved from the coating application position 80 (i.e., heads 32 in contact with the upper surface 42) and into the curing position 82 (i.e., heads 32 spaced away from the upper surface 42). The free ends 36 of the fasteners 142 (i.e., members 30) may be forced upwardly when the rack assembly 38 is moved across the ramp 124. In this manner, the fastener 142 heads 32 are lifted away from the upper surface 42 and into the curing position 82. The rack assembly 38 may then be moved toward a back end of the housing 12 to clear an area within which an additional rack assembly 38 may be received.

The above-described sequence may be repeated until all the heads 32 of the members 30 are painted or until the housing 12 is filled with rack assemblies 38. The air source 26 may be activated to deliver temperature and humidity-conditioned air that is conducive to curing of the paint until curing is complete. An operator may allow for a period of time for solvent flash off or solvent evaporation from the coating material 106 prior to removal of the painting apparatus 10 from the paint booth 120 and/or prior to removal of the panels 44 or rack assemblies 38 from the housing 12 and/or removal of the members 30 from the panels 44.

Figure 13:
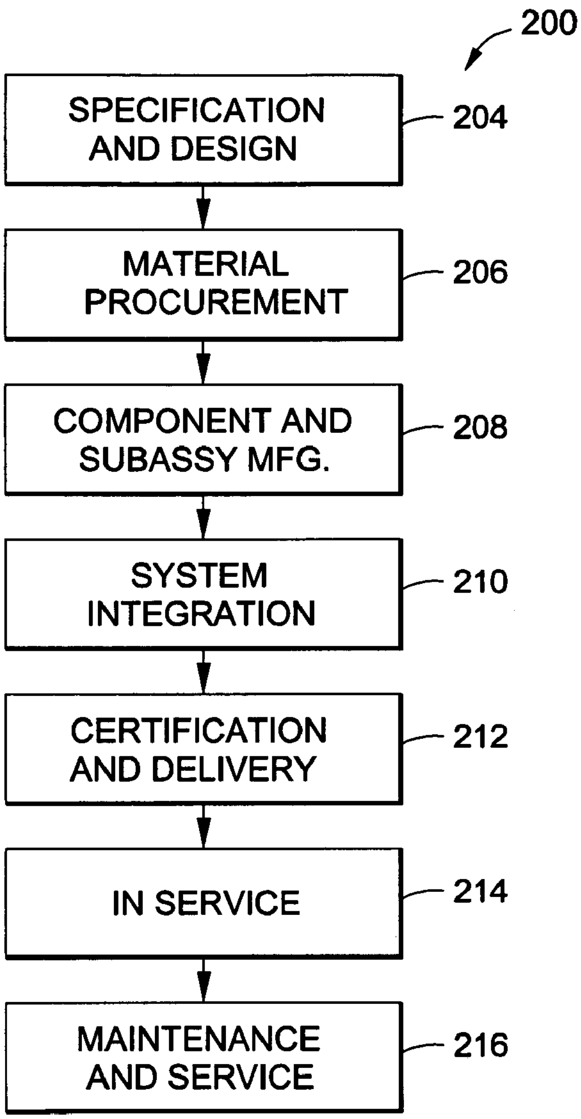
FIG. 13 is a flow diagram of an aircraft production and service methodology.
Figure 14:
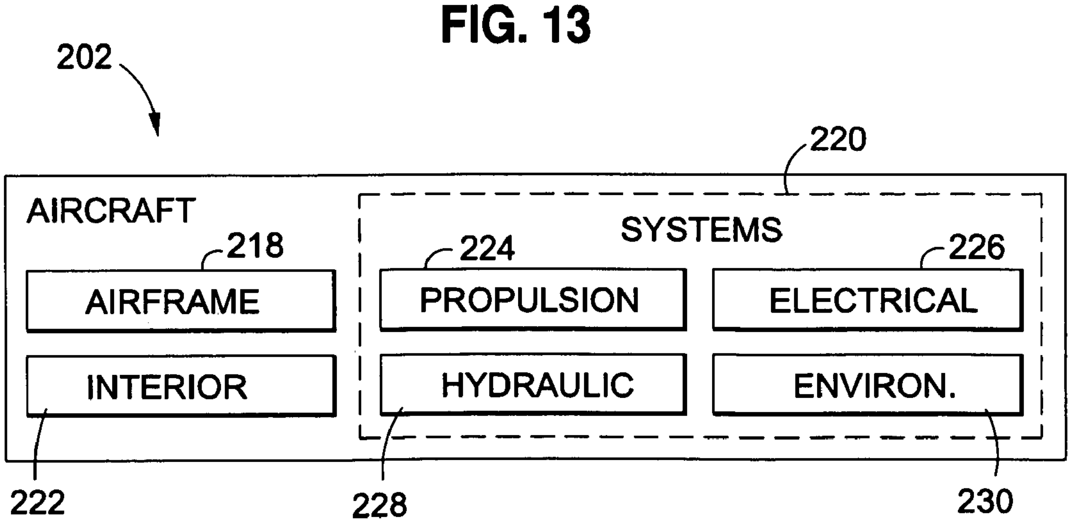
FIG. 14 is a block diagram of an aircraft.

Referring to FIGS. 13-14, embodiments of the disclosure may be described in the context of an aircraft manufacturing and service method 200 as shown in FIG. 13 and an aircraft 202 as shown in FIG. 14. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosed embodiments may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A painting apparatus for applying a coating material to a member surfaces of a corresponding plurality of members, the painting apparatus comprising:

a housing;

a slide rail mountable within the housing and having a plurality of rack positions;

a rack assembly mountable within the housing in correspondence with one of the rack positions, the rack assembly being configured to support the members such that the member surfaces are exposed;

a cross beam coupled to the slide rail and being movable along the slide rail, the cross beam being positionable at the rack position having the rack assembly mounted in correspondence therewith;

a spraying device mountable on the cross beam and being configured to move along the cross beam while spraying the coating material onto the member surfaces; and a lifting mechanism configured to move the members from a coating application position wherein a portion of the members are in contact with an upper surface of the rack assembly, to a curing position wherein the portion of the members are moved away from the upper surface of the rack assembly;

each one of the members having a shaft extending from the member surface, the lifting mechanism including a lifting plate positionable beneath the shafts and being operative to bear upwardly against the shafts to cause the member surfaces to be pushed away from the upper surface of the rack assembly.

2. The apparatus of claim 1 wherein:

the member surface comprises at least one surface of a head of the member.

3. The apparatus of claim 1 wherein:

the at least one slide rail comprises a pair of slide rails;

at least one of the slide rails having the plurality of rack positions;

the cross beam having opposing ends coupled to the pair of slide rails.

4. The apparatus of claim 1 further comprising:

a plurality of the rack assemblies mountable within the housing at a corresponding plurality of the rack positions, each one of the rack assemblies having at least one member mounted thereon such that the member surface is exposed;

wherein:

the cross beam is configured to stop at each one of the rack positions, the spraying device being operative to move along the cross beam for spraying the coating material onto the member surface of the member mounted in each one of the rack assemblies.

5. The apparatus of claim 1 wherein:

at least one of the rack positions includes a no-rack stop configured to prevent the positioning of the cross beam at the no-rack stop.

6. The apparatus of claim 1 further comprising:

an air source;

wherein:

the housing defines a chamber;

the air source being operative to maintain at least one of a temperature and a relative humidity of the chamber.

7. The apparatus of claim 6 wherein the air source is configured to maintain the chamber to at least one of the following:

a temperature of between approximately 55 and 95 degrees Fahrenheit;

a relative humidity of between approximately 30 and 60 percent.

8. A painting apparatus for applying a coating material to member surfaces of a corresponding plurality of members each having a shaft, the paining apparatus comprising:

a housing defining a chamber;

a pressurized air source operative to deliver temperature and humidity-controlled air to the chamber;

at least one slide rail mountable within the housing, the slide rail having a plurality of rack positions, each one of the rack positions including an index step, at least one of the rack positions including a no-rack stop configured to prevent the positioning of the cross beam at the no-rack stop;

at least one rack assembly mountable within the housing at one of the rack positions and being configured to support the members, the rack assembly including:

a panel having an upper surface and including at least one aperture, the aperture being sized and configured to receive the shafts such that the member surfaces are supported by the upper surface;

a cross beam being movable along a length of the cross beam and being operative to stop at each one of the rack positions;

spraying device mountable on the cross beam and being configured to move along the cross beam while spraying a coating material onto the member surfaces; and a lifting mechanism operative to hear upwardly against the shafts and move the members from a coating application position wherein the member surfaces are in contact with the panel upper surface, to a curing position wherein the member surfaces are moved away from the panel upper surface;

the shaft of each one of the members extending from the member surface of each member, the lifting mechanism including a lifting plate positionable beneath the shafts and being operative to bear upwardly against the shafts to cause the member surfaces to be pushed away from the panel upper surface.

9. A painting apparatus for applying a coating material to a plurality of heads of a corresponding plurality of members, the painting apparatus comprising;

a housing defining a chamber;

a rack assembly removably mountable within the housing and being configured to support the members such that the heads are exposed, a cross beam fixedly mounted to the housing, the cross beam being positioned above the rack assembly;

a spraying device mountable on the cross beam and being configured to move along the cross beam while spraying a coating material onto the heads; and a lifting mechanism configured to move the member from a coating application position wherein the heads are in contact with an upper surface of the rack assembly, to a curing position wherein the heads are moved away from the upper surface of the rack assembly;

each one of the members having a shaft extending from the heads, the lifting mechanism including a lifting plate positionable beneath the shafts and being operative to bear upwardly against the shafts to cause the heads to be pushed away from the upper surface of the rack assembly.

10. The apparatus of claim 9 wherein:

each one of the members includes a shaft terminating at a free end;

the lifting mechanism comprising a ramp positioned along a floor of the housing such that the free ends are forced upwardly causing the heads to be separated from the upper surface of the rack assembly when the rack assembly is moved across the ramp.

11. The apparatus of claim 9 further comprising:

an air source operative to maintain at least one of a temperature and a relative humidity of the chamber.

12. The apparatus of claim 9 further comprising:

at least one limit switch positionable at one of opposing ends of the cross beam and being operative to cause at least one of the following: stopping the movement of the spraying device along the cross beam, stopping the spraying of the coating material from the spraying device.

* * * * *